United States Patent
Lee et al.

(10) Patent No.: US 12,475,403 B2
(45) Date of Patent: Nov. 18, 2025

(54) FAULT TOLERANT QUANTUM ERROR CORRECTION USING PHYSICAL TRANSPORT OF QUBITS

(71) Applicant: Quantinuum LLC, Broomfield, CO (US)

(72) Inventors: Patricia Lee, Broomfield, CO (US); Christopher Langer, Highlands Ranch, CO (US); Russell Stutz, Broomfield, CO (US); Ciaran Ryan-Anderson, Broomfield, CO (US); Natalie Brown, Broomfield, CO (US); Alex Chernoguzov, Warrington, PA (US); Dominic Lucchetti, Louisville, CO (US); Brian Neyenhuis, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 28 days.

(21) Appl. No.: 18/347,054

(22) Filed: Jul. 5, 2023

(65) Prior Publication Data
US 2024/0354630 A1    Oct. 24, 2024

Related U.S. Application Data

(60) Provisional application No. 63/368,421, filed on Jul. 14, 2022.

(51) Int. Cl.
G06N 10/70 (2022.01)
G06F 11/10 (2006.01)
G06N 10/40 (2022.01)

(52) U.S. Cl.
CPC ......... *G06N 10/70* (2022.01); *G06F 11/1044* (2013.01); *G06N 10/40* (2022.01)

(58) Field of Classification Search
CPC .............................. G06N 10/70; G06N 10/40
See application file for complete search history.

(56) References Cited

U.S. PATENT DOCUMENTS

| 11,842,250 B2 * | 12/2023 | Zheng ................... G06N 3/045 |
| 2021/0194507 A1 * | 6/2021 | Delfosse ................ G06N 10/70 |
| 2022/0269963 A1 * | 8/2022 | Delfosse ............. G06F 16/9024 |

OTHER PUBLICATIONS

Ryan-Anderson, C., et al., "Implementing Fault-Tolerant Entangling Gates on the Five-Qubit Code and the Color Code", dated Aug. 4, 2022, retrieved from Cornell University Online Library Archive on the Internet at https://arxiv.org/pdf/2208.01863.pdf on Mar. 6, 2024, 17 pages.

(Continued)

*Primary Examiner* — Mark D Featherstone
(74) *Attorney, Agent, or Firm* — Alston & Bird LLP

(57) ABSTRACT

A quantum computing system comprises a classical computing entity, a controller, and a quantum processor. The controller is configured to control operation of the quantum processor and communicate with the computing entity. The controller causes performance of syndrome circuit segments to generate syndromes of logical qubits. The syndrome circuit segment is performed at least partially by causing performance of a sequence of transportation operations and at-least-two-physical-qubits interactions. Each transportation operation of the sequence causes physical transport of at least one of a respective data qubit of the logical qubit or a respective ancilla qubit into a respective interaction zone defined by the quantum processor. A respective at-least-two-physical-qubits interaction is performed within the respective interaction zone. Using the syndrome, at least one quantum error correction is determined; and the controller causes a classical memory to be updated based on the syndrome and/or the quantum error correction.

26 Claims, 10 Drawing Sheets

(56) References Cited

OTHER PUBLICATIONS

Ryan-Anderson, C., et al., "Realization of real-time fault-tolerant quantum error correction", Jul. 16, 2021, retrieved from the Internet at https://arxiv.org/pdf/2107.07505.pdf on Sep. 12, 2023, 22 pages.
U.S. Provisional Application for "Quantum System Controller Configured for Quantum Error Correction", unpublished (filed Aug. 19, 2021), Ciaran Ryan-Anderson (Inventor), Quantinuum LLC (Assignee), U.S. Appl. No. 63/235,022.
IPEA/408—Written Opinion of the IPEA Mailed on Oct. 8, 2024 for WO Application No. PCT/US23/027588, 8 page(s).
Outgoing—ISA/210—International Search Report Mailed on Oct. 8, 2024 for WO Application No. PCT/US23027588, 3 page(s).
Ryan-Anderson, C., et al., "Realization of real-time fault-tolerant quantum error correction", Physical Review X, Dec. 23, 2021, 29 pages, vol. 11, No. 041058, American Physical Society, USA.
Sargaran, Sahar, et al., "SAQIP: A Scalable Architecture for Quantum Information Processors", ACM Transactions on Architecture and Code Optimization (TACO), Apr. 18, 2019, 21 pages, vol. 16, No. 2, article No. 12, Association of Computing Machinery, USA.

\* cited by examiner

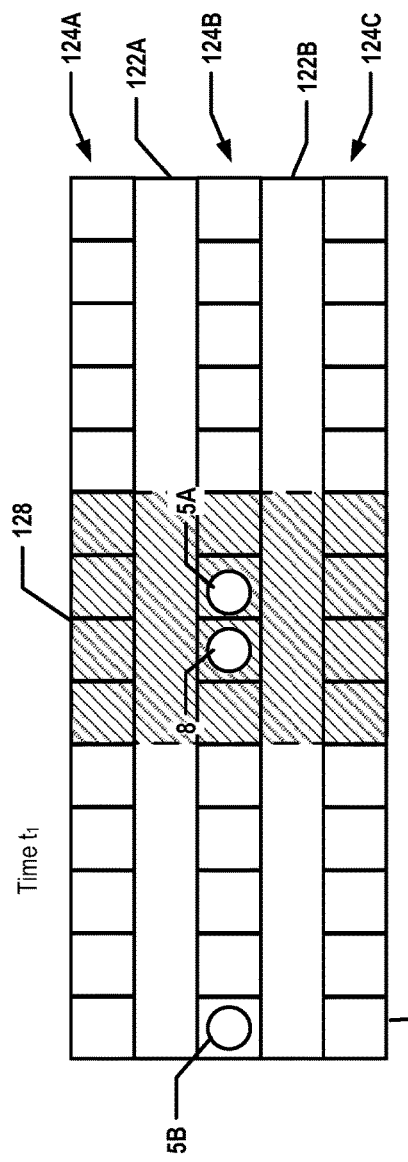
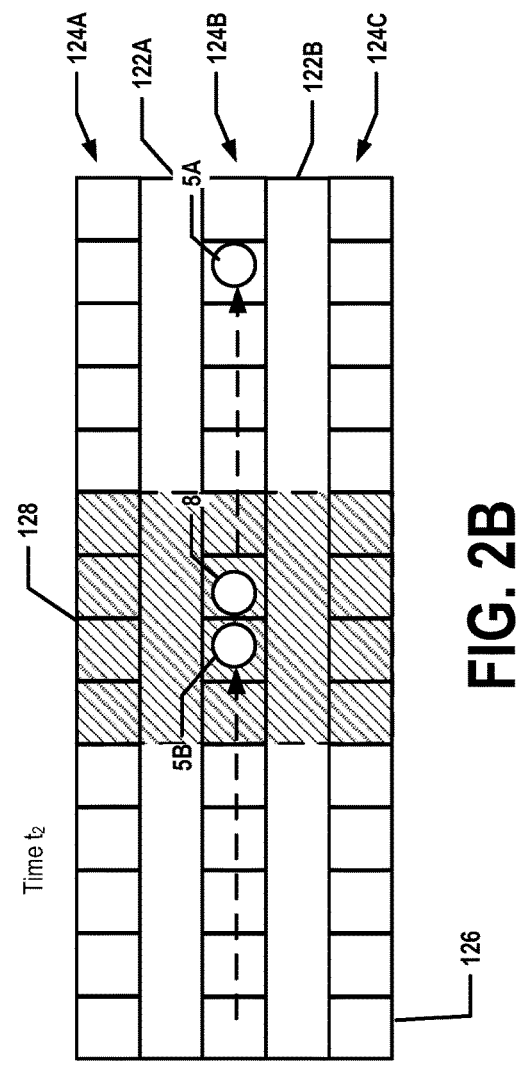

FAULT TOLERANT QUANTUM ERROR CORRECTION USING PHYSICAL TRANSPORT OF QUBITS

CROSS-REFERENCE TO RELATED APPLICATIONS

This application claims priority to U.S. Application No. 63/368,421, filed Jul. 14, 2022, the content of which is incorporated herein by reference in its entirety.

TECHNICAL FIELD

Various embodiments relate to fault tolerant quantum error correction using physical transport of one or more qubits. Various embodiments relate to fault tolerant quantum error correction corresponding to quantum processors in which nearest neighbor qubits are not defined, for which qubit connectivity is high, and/or for which relative qubit locations are changeable.

BACKGROUND

Complex quantum computations demand levels of precision that are not available in conventional quantum computers due to imperfect control and noise in gate operations between data qubits, for example. Through applied effort, ingenuity, and innovation many deficiencies of prior systems have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products, controllers configured to control operation of quantum processors, and/or the like for performing fault tolerant quantum computing and/or fault tolerant quantum error correction wherein the performance of syndrome circuit segments and/or application of physical quantum error corrections include the physical transport of one more qubits (e.g., data qubit(s) of a logical qubit and/or ancilla qubit(s)).

According to a first aspect, a method for performing fault tolerant quantum error correction using physical transport of qubits is provided. In an example embodiment, the method is performed by a quantum computing system comprising a classical computing entity, a controller, and a quantum processor. The controller is configured to control operation of the quantum processor and is in communication with the classical computing entity. In an example embodiment, the method comprises causing, by the controller, performance of at least one syndrome circuit segment to generate a syndrome of a logical qubit. The at least one syndrome circuit segment is performed at least in part by causing performance of a sequence of transportation operations and at-least-two-physical-qubits interactions (e.g., interactions between two or more physical qubits such as a two (physical) qubit gate and/or the like). Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the at least one of (a) the respective data qubit of the logical qubit or (b) the respective ancilla qubit is disposed within the respective interaction zone and a respective at-least-two-physical-qubits interaction is performed thereon. The method further comprises, based at least in part on the syndrome of the logical qubit, determining, by the classical computing entity, at least one quantum error correction; and causing, by the controller, a classical memory of at least one of the controller or the classical computing entity to be updated based on at least one of the syndrome or the at least one quantum error correction In an example embodiment, the method further comprises causing, by the controller, the at least one quantum error correction to be applied to the logical qubit.

In an example embodiment, causing the at least one quantum error correction to be applied to the logical qubit comprises at least one of (a) updating a classical qubit registry corresponding to logical qubit based on the at least one quantum error correction, (b) causing performance of a physical correction to one or more data qubits of the logical qubit, or (c) causing a logical operation to be performed at least in part on one or more data qubits of the logical qubit to be modified based at least in part on the at least one quantum error correction.

In an example embodiment, causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

In an example embodiment, performance of the at least one syndrome circuit segment comprises performance of a plurality of syndrome circuit segments.

In an example embodiment, causing performance of the at least one syndrome circuit segment comprises causing performance of a first plurality of syndrome circuit segments, wherein the first plurality of syndrome circuit segments were selected from a defined set of syndrome circuit segments using a stochastic selection process; determining, based at least in part on respective results of the first plurality of syndrome circuit segments, whether to cause performance of a second plurality of syndrome circuit segments, the second plurality of syndrome circuit segments selected from the defined set of syndrome circuit segments; responsive to determining to cause performance of the second plurality of syndrome circuit segments, causing performance of the second plurality of syndrome circuit segments; and responsive to determining to not cause performance of the second plurality of syndrome circuit segments, determining the at least one quantum error correction based at least in part on the respective results of the first plurality of syndrome circuit segments.

In an example embodiment, the logical qubit is one of a plurality of logical qubits and the ancilla qubit is used to perform syndrome circuit segments for two or more logical qubits of the plurality of logical qubits.

In an example embodiment, the at least one syndrome circuit segment comprises a flagged syndrome circuit segment wherein a first ancilla qubit of two or more ancilla qubits used to perform the at least one syndrome circuit segment is used as flag qubit.

In an example embodiment, the method further comprises tracking, using at least classical qubit registry, a value of the flag qubit; and causing performance of an unflagged syndrome circuit segment in response to determining that the value of the flag qubit has changed.

In an example embodiment, updating the classical memory based on at least one of the syndrome or the at least one quantum error correction comprises tracking the syndrome of the logical qubit in the classical memory.

In an example embodiment, coherence of the respective data qubit of the logical qubit is maintained during performance of the at least one syndrome circuit segment.

In an example embodiment, the method further comprises prior to causing performance of the at least one syndrome circuit segment, causing performance of a state preparation circuit segment for preparing a state of the respective ancilla qubit; and causing the respective ancilla qubit to be read after the performance of the sequence of transportation operations and at-least-two-physical-qubits interactions, wherein the syndrome of the logical qubit is generated based at least in part on a result of the reading of the respective ancilla qubit.

According to another aspect, a quantum computing system configured for performing fault tolerant quantum error correction using physical transport of qubits is provided. In an example embodiment, the quantum computing system comprises a classical computing entity, a controller, and a quantum processor. The controller is configured to control operation of the quantum processor and is in communication with the classical computing entity. In an example embodiment, the controller is configured to cause performance of at least one syndrome circuit segment to generate a syndrome of a logical qubit. The at least one syndrome circuit segment is performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the at least one of (a) the respective data qubit of the logical qubit or (b) the respective ancilla qubit is disposed within the respective interaction zone and a respective at-least-two-physical-qubits interaction is performed thereon. The classical computing entity is configured to, based at least in part on the syndrome of the logical qubit, determining, by the classical computing entity, at least one quantum error correction. The controller is further configured to cause a classical memory of at least one of the controller or the classical computing entity to be updated based on at least one of the syndrome or the at least one quantum error correction.

In an example embodiment, the controller is further configured to cause the at least one quantum error correction to be applied to the logical qubit.

In an example embodiment, causing the at least one quantum error correction to be applied to the logical qubit comprises at least one of (a) updating a classical qubit registry corresponding to logical qubit based on the at least one quantum error correction, (b) causing performance of a physical correction to one or more data qubits of the logical qubit, or (c) causing a logical operation to be performed at least in part on one or more data qubits of the logical qubit to be modified based at least in part on the at least one quantum error correction.

In an example embodiment, causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

In an example embodiment, performance of the at least one syndrome circuit segment comprises performance of a plurality of syndrome circuit segments.

In an example embodiment, causing performance of the at least one syndrome circuit segment comprises causing performance of a first plurality of syndrome circuit segments, wherein the first plurality of syndrome circuit segments were selected from a defined set of syndrome circuit segments using a stochastic selection process; determining, based at least in part on respective results of the first plurality of syndrome circuit segments, whether to cause performance of a second plurality of syndrome circuit segments, the second plurality of syndrome circuit segments selected from the defined set of syndrome circuit segments; responsive to determining to cause performance of the second plurality of syndrome circuit segments, causing performance of the second plurality of syndrome circuit segments; and responsive to determining to not cause performance of the second plurality of syndrome circuit segments, determining the at least one quantum error correction based at least in part on the respective results of the first plurality of syndrome circuit segments.

In an example embodiment, the logical qubit is one of a plurality of logical qubits and the ancilla qubit is used to perform syndrome circuit segments for two or more logical qubits of the plurality of logical qubits.

In an example embodiment, the at least one syndrome circuit segment comprises a flagged syndrome circuit segment wherein a first ancilla qubit of two or more ancilla qubits used to perform the at least one syndrome circuit segment is used as flag qubit.

In an example embodiment, the controller is further configured to track, using at least a classical qubit registry, a value of the flag qubit; and cause performance of an unflagged syndrome circuit segment in response to determining that the value of the flag qubit has changed.

In an example embodiment, updating the classical memory based on at least one of the syndrome or the at least one quantum error correction comprises tracking the syndrome of the logical qubit in the classical memory.

In an example embodiment, coherence of the respective data qubit of the logical qubit is maintained during performance of the at least one syndrome circuit segment.

In an example embodiment, wherein the controller is further configured to, prior to causing performance of the at least one syndrome circuit segment, cause performance of a state preparation circuit segment for preparing a state of the respective ancilla qubit; and cause the respective ancilla qubit to be read after the performance of the sequence of transportation operations and at-least-two-physical-qubits interactions, wherein the syndrome of the logical qubit is generated based at least in part on a result of the reading of the respective ancilla qubit.

According to another aspect, a controller configured to control operation of a quantum processor and cause performance of fault tolerant quantum error correction using physical transport of qubits is provided. In an example embodiment, the controller is configured for communicating a classical computing entity. In an example embodiment, the controller is configured (and/or programmed) to cause performance of at least one syndrome circuit segment to generate a syndrome of a logical qubit. The at least one syndrome circuit segment is performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the at least one of (a) the respective data qubit of the logical qubit or (b) the respective ancilla qubit is disposed within the respective interaction zone and a respective at-least-two-physical-qubits interaction is performed thereon. The controller is further configured to cause the classical computing entity to determine at least one quantum error correction based at least in part on the syndrome of the logical qubit. The controller is further configured to cause the at least one quantum error correction to be applied to the logical qubit.

In an example embodiment, causing the at least one quantum error correction to be applied to the logical qubit comprises at least one of (a) updating a classical qubit registry corresponding to logical qubit based on the at least one quantum error correction, (b) causing performance of a physical correction to one or more data qubits of the logical qubit, or (c) causing a logical operation to be performed at least in part on one or more data qubits of the logical qubit to be modified based at least in part on the at least one quantum error correction.

In an example embodiment, causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

In an example embodiment, performance of the at least one syndrome circuit segment comprises performance of a plurality of syndrome circuit segments.

In an example embodiment, causing performance of the at least one syndrome circuit segment comprises causing performance of a first plurality of syndrome circuit segments, wherein the first plurality of syndrome circuit segments were selected from a defined set of syndrome circuit segments using a stochastic selection process; determining, based at least in part on respective results of the first plurality of syndrome circuit segments, whether to cause performance of a second plurality of syndrome circuit segments, the second plurality of syndrome circuit segments selected from the defined set of syndrome circuit segments; responsive to determining to cause performance of the second plurality of syndrome circuit segments, causing performance of the second plurality of syndrome circuit segments; and responsive to determining to not cause performance of the second plurality of syndrome circuit segments, determining the at least one quantum error correction based at least in part on the respective results of the first plurality of syndrome circuit segments.

In an example embodiment, the logical qubit is one of a plurality of logical qubits and the ancilla qubit is used to perform syndrome circuit segments for two or more logical qubits of the plurality of logical qubits.

In an example embodiment, the at least one syndrome circuit segment comprises a flagged syndrome circuit segment wherein a first ancilla qubit of two or more ancilla qubits used to perform the at least one syndrome circuit segment is used as flag qubit.

In an example embodiment, the controller is further configured to track, using at least a classical qubit registry, a value of the flag qubit; and cause performance of an unflagged syndrome circuit segment in response to determining that the value of the flag qubit has changed.

In an example embodiment, updating the classical memory based on at least one of the syndrome or the at least one quantum error correction comprises tracking the syndrome of the logical qubit in the classical memory.

In an example embodiment, coherence of the respective data qubit of the logical qubit is maintained during performance of the at least one syndrome circuit segment.

In an example embodiment, wherein the controller is further configured to, prior to causing performance of the at least one syndrome circuit segment, cause performance of a state preparation circuit segment for preparing a state of the respective ancilla qubit; and cause the respective ancilla qubit to be read after the performance of the sequence of transportation operations and at-least-two-physical-qubits interactions, wherein the syndrome of the logical qubit is generated based at least in part on a result of the reading of the respective ancilla qubit.

According to another aspect, a computer program product comprising at least one non-transitory computer-readable medium is provided. The at least one computer-readable memory stores computer-executable instructions configured to, when executed by a processing element of a controller, cause the controller to control operation of a quantum processor and cause performance of fault tolerant quantum error correction using physical transport of qubits is provided. In an example embodiment, the computer-executable instructions are configured to, when executed by the processing element of the controller, cause the controller to cause performance of at least one syndrome circuit segment to generate a syndrome of a logical qubit. The at least one syndrome circuit segment is performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the respective data qubit of the logical qubit and the respective ancilla qubit are disposed within the respective interaction zone and a respective at-least-two-physical-qubits interaction is performed thereon. The computer-executable instructions are further configured to, when executed by the processing element of the controller, cause the controller to cause a classical computing entity in communication with the controller to determine at least one quantum error correction based at least in part on the syndrome of the logical qubit; and cause a classical memory of at least one of the controller or the classical computing entity to be updated based on at least one of the syndrome or the at least one quantum error correction/

In an example embodiment, the computer-executable instructions are further configured to, when executed by the processing element of the controller, cause the controller to cause the at least one quantum error correction to be applied to the logical qubit.

In an example embodiment, causing the at least one quantum error correction to be applied to the logical qubit comprises at least one of (a) updating a classical qubit registry corresponding to logical qubit based on the at least one quantum error correction, (b) causing performance of a physical correction to one or more data qubits of the logical qubit, or (c) causing a logical operation to be performed at least in part on one or more data qubits of the logical qubit to be modified based at least in part on the at least one quantum error correction.

In an example embodiment, causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

In an example embodiment, performance of the at least one syndrome circuit segment comprises performance of a plurality of syndrome circuit segments.

In an example embodiment, causing performance of the at least one syndrome circuit segment comprises causing performance of a first plurality of syndrome circuit segments, wherein the first plurality of syndrome circuit segments were selected from a defined set of syndrome circuit segments using a stochastic selection process; determining, based at least in part on respective results of the first plurality of syndrome circuit segments, whether to cause performance of a second plurality of syndrome circuit segments, the second plurality of syndrome circuit segments selected from the defined set of syndrome circuit segments; responsive to determining to cause performance of the second plurality of syndrome circuit segments, causing performance of the second plurality of syndrome circuit segments; and responsive to determining to not cause performance of the second plurality of syndrome circuit segments, determining the at least one quantum error correction based at least in part on the respective results of the first plurality of syndrome circuit segments.

In an example embodiment, the logical qubit is one of a plurality of logical qubits and the ancilla qubit is used to perform syndrome circuit segments for two or more logical qubits of the plurality of logical qubits.

In an example embodiment, the at least one syndrome circuit segment comprises a flagged syndrome circuit segment wherein a first ancilla qubit of two or more ancilla qubits used to perform the at least one syndrome circuit segment is used as flag qubit.

In an example embodiment, wherein the computer-executable instructions are further configured to, when executed by the processing element of the controller, cause the controller to track, using at least one classical qubit registry, a value of the flag qubit; and cause performance of an unflagged syndrome circuit segment in response to determining that the value of the flag qubit has changed.

In an example embodiment, wherein the computer-executable instructions are further configured to, when executed by the processing element of the controller, cause the controller to at least one of (a) track the syndrome of the logical qubit in a memory of the controller or (b) cause the classical computing entity to track the syndrome of the logical qubit in a memory of the classical computing entity.

In an example embodiment, coherence of the respective data qubit of the logical qubit is maintained during performance of the at least one syndrome circuit segment.

In an example embodiment, wherein the computer-executable instructions are further configured to, when executed by the processing element of the controller, cause the controller to, prior to causing performance of the at least one syndrome circuit segment, cause performance of a state preparation circuit segment for preparing a state of the respective ancilla qubit; and cause the respective ancilla qubit to be read after the performance of the sequence of transportation operations and at-least-two-physical-qubits interactions, wherein the syndrome of the logical qubit is generated based at least in part on a result of the reading of the respective ancilla qubit.

According to another aspect, a method for performing a logical multi-qubit gate (a logical gate between two or more logical qubits) is provided. In an example embodiment, the method comprises causing, by a controller configured to control operation of a quantum processor, the quantum processor to perform a first part of the logical multi-qubit gate by causing performance of a first group of at-least-two-physical-qubits interactions on at least a first subset of physical qubits of a set of physical qubits. The set of physical qubits comprises data qubits of a first logical qubit, data qubits of a second logical qubit, and one or more ancilla qubits. The logical multi-qubit gate is being performed on at least the first logical qubit and the second logical qubit. The method further comprises causing, by the controller, the quantum processor to perform a multi-qubit quantum error correction cycle comprising performance of at least one syndrome circuit segment to determine at least one syndrome and at least one quantum error correction; and causing, by the controller, the quantum processor to perform a second part of the logical multi-qubit gate by causing performance of a second group of at-least-two-physical-qubits interactions on at least a second subset of physical qubits of the set of physical qubits.

In an example embodiment, at least one at-least-two-physical-qubits interaction of the second group of at-least-two-physical-qubits interactions is modified based at least in part on the at least one quantum error correction.

In an example embodiment, the method further comprises at least one of (a) causing performance of a physical correction on at least one of the first logical qubit or the second logical qubit after completion of the logical multi-qubit gate based on the at least one quantum error correction or (b) causing performance of an operation on at least one of the first logical qubit or the second logical qubit after completion of the logical multi-qubit gate is modified based at least in part on the at least one quantum error correction.

In an example embodiment, a physical correction is performed on at least one of the first logical qubit or the second logical qubit prior to the performance of the second group of at-least-two-physical-qubits interactions.

In an example embodiment, the method further comprises causing tracking of at least one of the at least one syndrome or the at least one quantum error correction in a classical memory.

In an example embodiment, performing at least one of the first group of at-least-two-physical-qubits interactions, the at least one syndrome circuit segment, or the second group of at-least-two-physical qubits interactions comprises causing transportation of one or more physical qubits of the set of physical qubits into or out of one or more interaction zones defined by the quantum processor.

According to another aspect, a controller configured to control operation of a quantum processor and cause performance of fault tolerant quantum error correction using physical transport of qubits is provided. In an example embodiment, the controller is configured (and/or programmed) to cause the quantum processor to perform a first part of the logical multi-qubit gate by causing performance of a first group of at-least-two-physical-qubits interactions on at least a first subset of physical qubits of a set of physical qubits. The set of physical qubits comprises data qubits of a first logical qubit, data qubits of a second logical qubit, and one or more ancilla qubits. The logical multi-qubit gate is being performed on at least the first logical qubit and the second logical qubit. The controller is further configured to cause the quantum processor to perform a multi-qubit quantum error correction cycle comprising performance of at least one syndrome circuit segment to determine at least one syndrome and at least one quantum error correction; and cause the quantum processor to perform a second part of the logical multi-qubit gate by causing performance of a second group of at-least-two-physical-qubits interactions on at least a second subset of physical qubits of the set of physical qubits.

In an example embodiment, at least one at-least-two-physical-qubits interaction of the second group of at-least-two-physical-qubits interactions is modified based at least in part on the at least one quantum error correction.

In an example embodiment, the controller is further configured to at least one of (a) cause performance of a physical correction on at least one of the first logical qubit or the second logical qubit after completion of the logical multi-qubit gate based on the at least one quantum error correction or (b) cause performance of an operation on at least one of the first logical qubit or the second logical qubit after completion of the logical multi-qubit gate is modified based at least in part on the at least one quantum error correction.

In an example embodiment, a physical correction is performed on at least one of the first logical qubit or the second logical qubit prior to the performance of the second group of at-least-two-physical-qubits interactions.

In an example embodiment, the controller is further configured to cause tracking of at least one of the at least one syndrome or the at least one quantum error correction in a classical memory.

In an example embodiment, performing at least one of the first group of at-least-two-physical-qubits interactions, the at least one syndrome circuit segment, or the second group of at-least-two-physical qubits interactions comprises causing transportation of one or more physical qubits of the set of physical qubits into or out of one or more interaction zones defined by the quantum processor.

According to another aspect, a computer program product comprising at least one non-transitory computer-readable medium is provided. The at least one computer-readable memory stores computer-executable instructions configured to, when executed by a processing element of a controller, cause the controller to control operation of a quantum processor and cause performance of fault tolerant quantum logical operation using physical transport of qubits is provided. In an example embodiment, the computer-executable instructions are configured to, when executed by the processing element of the controller, cause the controller to cause the quantum processor to perform a first part of the logical multi-qubit gate by causing performance of a first group of at-least-two-physical-qubits interactions on at least a first subset of physical qubits of a set of physical qubits. The set of physical qubits comprises data qubits of a first logical qubit, data qubits of a second logical qubit, and one or more ancilla qubits. The logical multi-qubit gate is being performed on at least the first logical qubit and the second logical qubit. The controller is further configured to cause the quantum processor to perform a multi-qubit quantum error correction cycle comprising performance of at least one syndrome circuit segment to determine at least one syndrome and at least one quantum error correction; and cause the quantum processor to perform a second part of the logical multi-qubit gate by causing performance of a second group of at-least-two-physical-qubits interactions on at least a second subset of physical qubits of the set of physical qubits.

In an example embodiment, at least one at-least-two-physical-qubits interaction of the second group of at-least-two-physical-qubits interactions is modified based at least in part on the at least one quantum error correction.

In an example embodiment, the computer-executable instructions are further configured to, when executed by the processing element of the controller, cause the controller to at least one of (a) cause performance of a physical correction on at least one of the first logical qubit or the second logical qubit after completion of the logical multi-qubit gate based on the at least one quantum error correction or (b) cause performance of an operation on at least one of the first logical qubit or the second logical qubit after completion of the logical multi-qubit gate is modified based at least in part on the at least one quantum error correction.

In an example embodiment, a physical correction is performed on at least one of the first logical qubit or the second logical qubit prior to the performance of the second group of at-least-two-physical-qubits interactions.

In an example embodiment, the computer-executable instructions are further configured to, when executed by the processing element of the controller, cause the controller to cause tracking of at least one of the at least one syndrome or the at least one quantum error correction in a classical memory.

In an example embodiment, performing at least one of the first group of at-least-two-physical-qubits interactions, the at least one syndrome circuit segment, or the second group of at-least-two-physical qubits interactions comprises causing transportation of one or more physical qubits of the set of physical qubits into or out of one or more interaction zones defined by the quantum processor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a schematic diagram illustrating an example quantum computing system, according to an example embodiment.

FIGS. 2A and 2B each provide a top view of a portion of an example confinement apparatus of an example quantum processor at respective times, according to an example embodiment.

FIG. 3 is a flowchart illustrating various processes, operations, and/or procedures performed by a quantum computing system, such as the quantum computing system of FIG. 1, for example, to perform a quantum circuit, according to various embodiments.

FIG. 4 provides a schematic diagram of an example controller configured to control operation of a confinement apparatus, according to an example embodiment.

Figure 9:
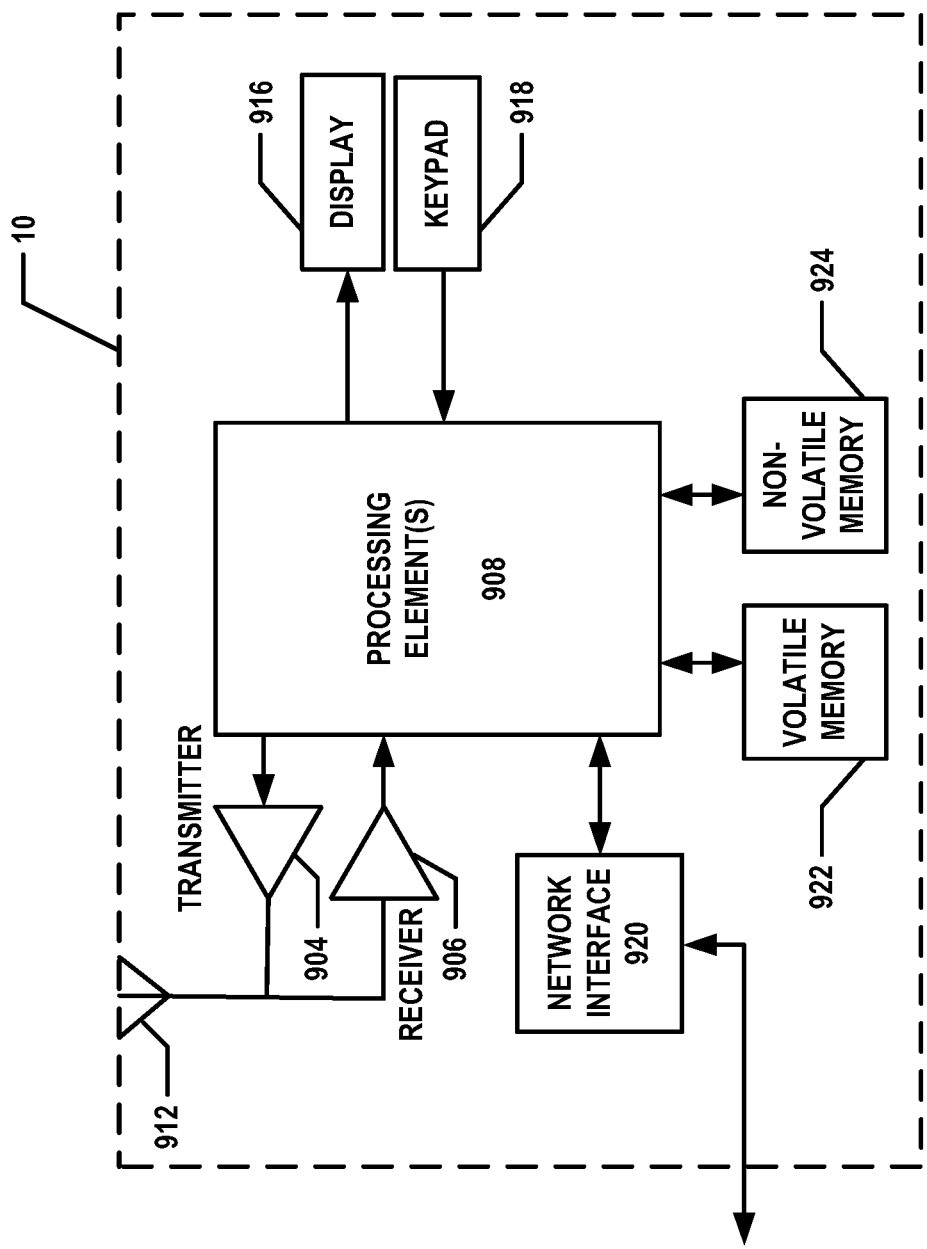

FIG. 9 provides a schematic diagram of an example computing entity that may be used in accordance with an example embodiment.

Figure 4:
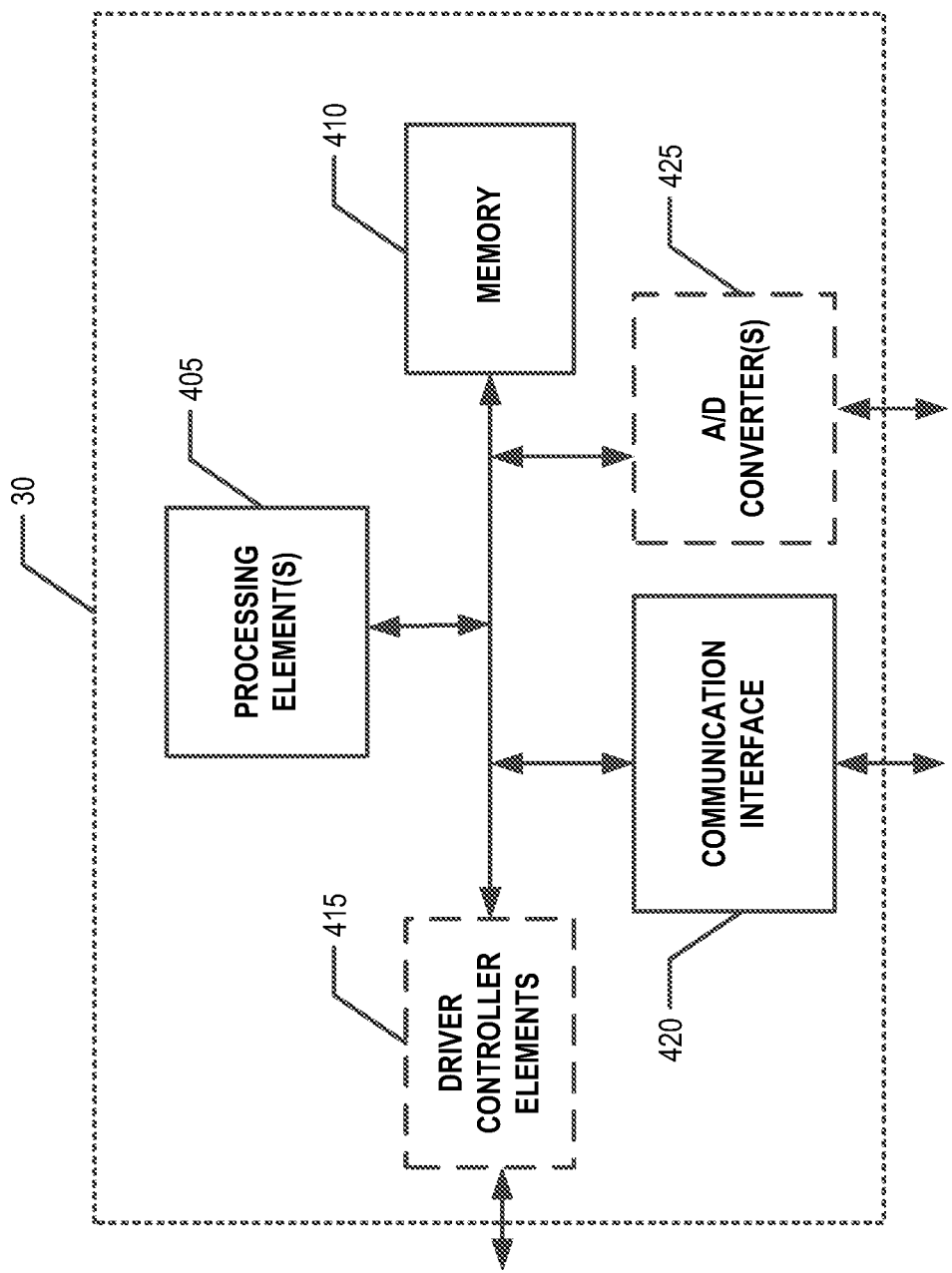
Figure 10:
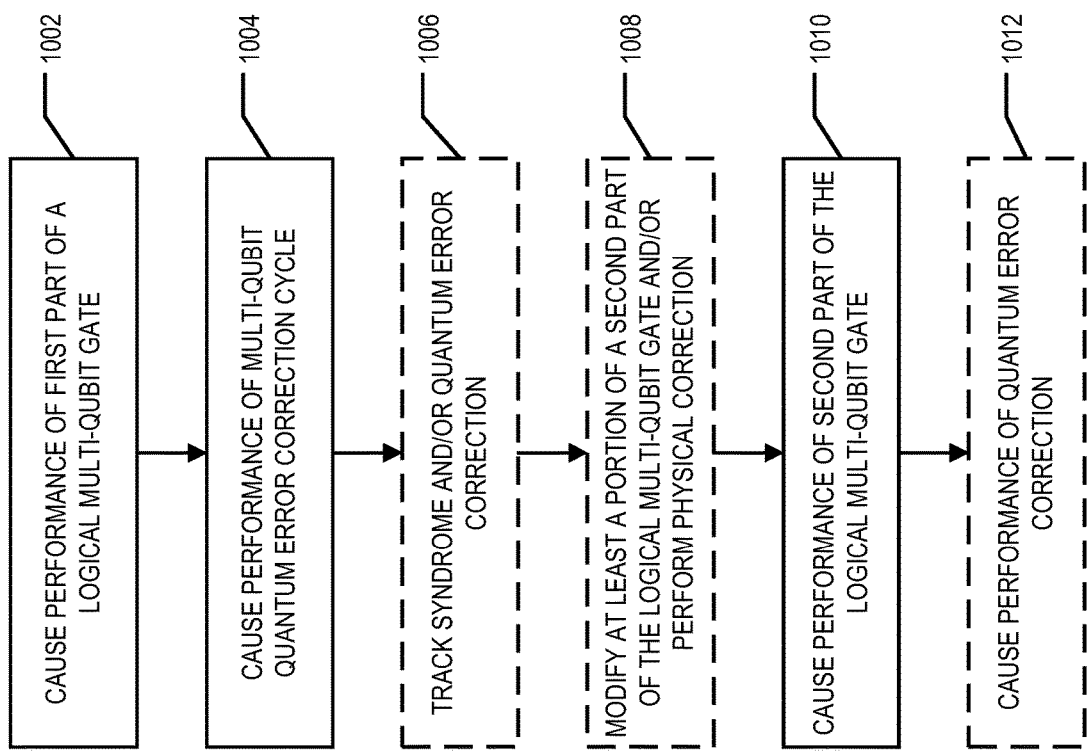

FIG. 10 is a flowchart illustrating various processes, operations, and/or procedures performed by a controller, such as the controller of FIG. 4, for example, to perform a fault tolerant logical multi-qubit gate, according to various embodiments.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally," "substantially," and "approximately" refer to within engineering and/or manufacturing tolerances and/or within user measurement capabilities, unless otherwise indicated. Like numbers refer to like elements throughout.

Example embodiments provide methods, systems, apparatuses, computer program products, controllers configured to control operation of quantum processors, and/or the like for performing fault tolerant quantum computing and/or fault tolerant quantum error correction wherein the performance of syndrome circuit segments and/or application of physical quantum error corrections include the physical transport of one more qubits (e.g., data qubit(s) of a logical qubit and/or ancilla qubit(s)). For example, in various embodiments, performance of a quantum program, algorithm or circuit (referred to as a quantum circuit herein) comprises the performance of one or more quantum error correction cycles. For example, quantum error correction cycles may be performed at various points during the performance of the quantum circuit.

During a quantum error correction cycle, one or more syndrome circuit segments are performed so as to generate, determine, and/or extract syndromes from one or more logical qubits used in performance of the quantum circuit. In various embodiments, a logical qubit comprises a plurality of data qubits and forms a binary logical element of the quantum processor. In various embodiments, a quantum error correction cycle may further include the determination of one or more quantum error corrections based on the generated, determined, and/or extracted syndromes and applying the one or more quantum error corrections to a respective logical qubit.

In various embodiments, at least one syndrome circuit segment is performed to generate a syndrome of a respective logical qubit. The at least one syndrome circuit segment is performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the respective data qubit of the logical qubit and the respective ancilla qubit are disposed within the respective interaction zone and a respective at-least-two-physical-qubits interaction is performed thereon. Based at least in part on the syndrome of the logical qubit, at least one quantum error correction is determined and applied to the logical qubit.

In various embodiments, the quantum error correction(s) comprise software corrections that are applied by tracking quantum errors experienced by a logical qubit in a classical qubit registry corresponding to the logical qubit, physically applying a correction to one or more data qubits of the logical qubit, and/or modifying a logical operation performed on one or more data qubits of the logical qubit based at least in part on the determined quantum error correction.

Example Quantum Computing System

Figure 1:
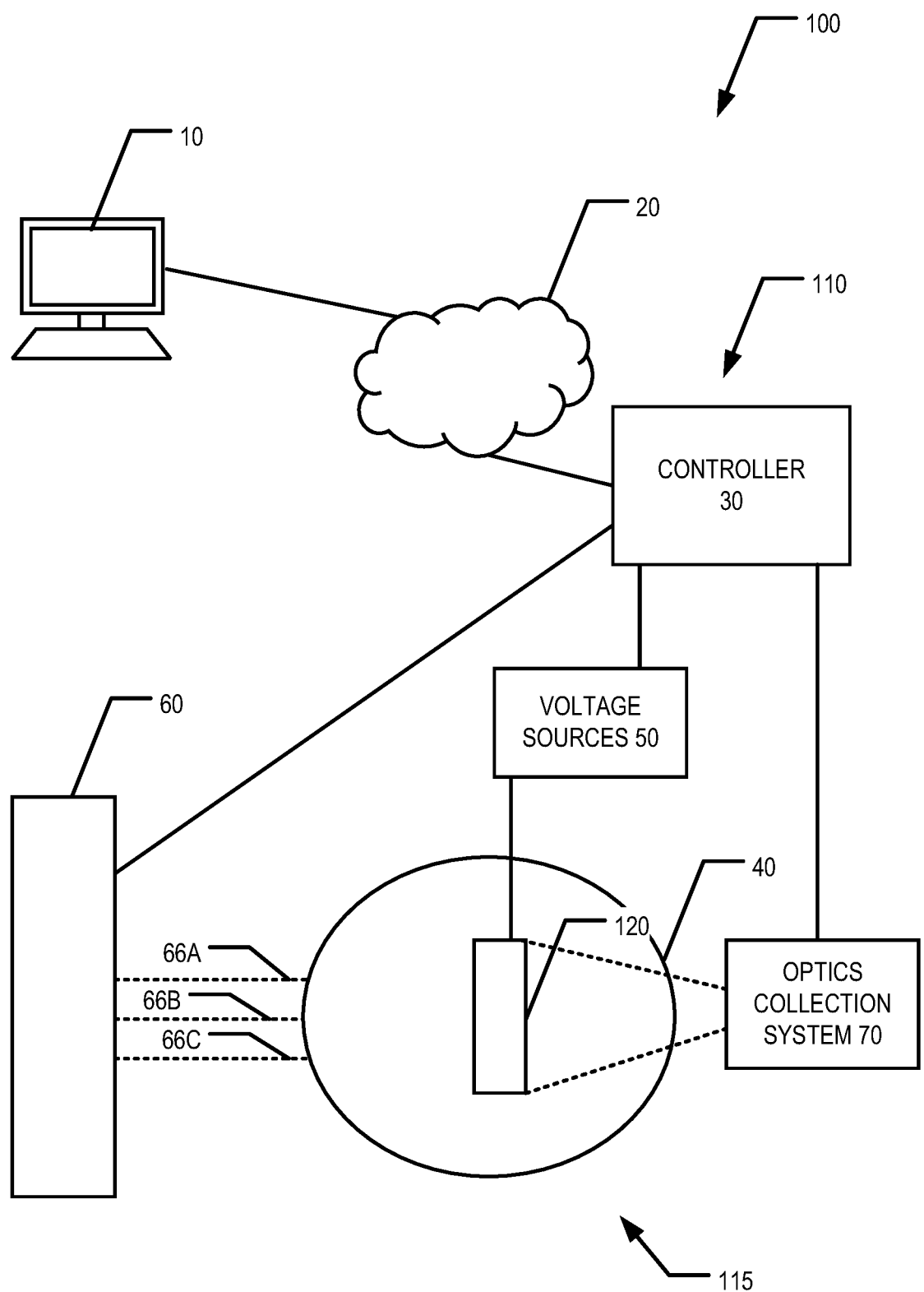

FIG. 1 illustrates an example quantum computing system configured to perform fault tolerant quantum error correction using data qubit transport. As should be understood, various embodiments relate to a variety of types of quantum computing systems in which the physical locations of qubits are not fixed (e.g., the physical qubit register is reconfigurable). For example, various embodiments relate to quantum computing systems that use ions, neutral atoms, quantum dots, quantum particles, and/or the like as qubits.

For example, FIG. 1 illustrates an example quantum charge-coupled device (QCCD)-based quantum computing system 100. The quantum computing system 100 comprises a classical computing entity 10, a controller 30, and a quantum processor 115. The controller 30 is configured to control operation of the quantum processor 115. The controller 30 and the classical computing entity 10 are in communication with one another via a direct wired and/or wireless connection and/or via one or more wired and/or wireless networks 20.

In the illustrated embodiment, the quantum processor 115 comprise a confinement apparatus 120 that is used to confine manipulatable objects such that various functions may be performed on the manipulatable objects. For example, in various embodiments, the confinement apparatus 120 is an ion trap and/or the like. For example, in various embodiments, the manipulatable objects are ions, multipole and/or charged molecules, charged particles, and/or the like. Various functions may be performed on the manipulatable objects such as state preparation, performance of logical gates, state reading/determination, cooling, transport between different locations of the confinement apparatus 120, and/or the like. In various embodiments, the logical gates performed on the manipulatable objects include transversal gates. Transversal gates are those for which an error-correcting code can achieve the transformation on a logical qubit by applying that gate on each of the data qubits of the logical qubit. For example, in a 5-qubit code, if you can achieve logical Hadamard on a logical qubit by applying Hadamard on each of the five data qubits of the logical qubit, that Hadamard gate is a transversal gate. In various embodiments, logical gates that are not transversal gates are used.

In various embodiments, the manipulatable objects comprise ancilla qubits and a plurality of data qubits that are organized into one or more logical qubits. In various embodiments, the ancilla qubits are used to probe the data qubits and/or logical qubits to determine one or more syndromes thereof. For example, the ancilla qubits are used to probe the data qubits and/or logical qubits such that the coherence of the respective data qubits of the respective logical qubits is maintained during performance of syndrome circuit segments. This enables the generation, determination, and/or tracking of syndromes of a logical qubit without destroying the coherence of the respective data qubits of the logical qubit.

In various embodiments, the quantum system controller 30 is configured, programmed, and/or the like to control the quantum processor 115. For example, the quantum processor 115 comprises a confinement apparatus 120 configured to confine a plurality of manipulatable objects. The quantum system controller 30 is configured to control operation of the confinement apparatus 120. In an example embodiment, the quantum processor 115 comprises a plurality of qubits (e.g., physical data qubits organized into logical qubits, ancilla qubits, and/or the like). In various embodiments, the data qubits and ancilla qubits are each embodied by a respective manipulatable object of the plurality of manipulatable objects confined by the confinement apparatus 120. In various embodiments, the quantum computer 110 includes or communicates with databases and/or programs (not shown), such as a quantum error decoder and/or quantum error correction determination application, program, and/or the like (e.g., stored by and/or operating on the classical computing entity 10). For example, the databases may be stored by one or more classical computing entities 10 that are in communication with the controller 30 via one or more wired and/or wireless networks 20 and/or stored by memory local to the controller 30.

In various embodiments, the quantum processor 115 comprises means for controlling the evolution of quantum states of the qubits. For example, in an example embodiment, the quantum processor 115 comprises a cryostat and/or vacuum chamber 40 enclosing a confinement apparatus 120 (e.g., an ion trap and/or the like), one or more manipulation sources 60, one or more voltage sources 50, and/or one or more optics collection systems 70. For example, the cryostat and/or vacuum chamber 40 may be a temperature and/or pressure-controlled chamber. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more manipulatable objects within the confinement apparatus 120. In various embodiments, the manipulatable objects within the confinement apparatus 120 (e.g., ions trapped within an ion trap) act as the data qubits and/or ancilla qubits of the quantum processor 115 of the quantum computer 110. For example, in an example embodiment, wherein the one or more manipulation sources 60 comprise one or more lasers, the lasers may provide one or more laser beams to manipulatable objects trapped within the confinement apparatus 120 within the cryostat and/or vacuum chamber 40. For example, the manipulation sources 60 may generate and/or provide laser beams configured to ionize manipulatable objects, initialize manipulatable objects within the defined two state qubit space of the quantum processor, perform gates (e.g., logical gates on logical qubits and/or physical gates on physical qubits) one or more qubits of the quantum processor, read a quantum state of one or more qubits of the quantum processor, and/or the like.

In various embodiments, the quantum computer 110 comprises an optics collection system 70 configured to collect and/or detect photons generated by qubits (e.g., during reading procedures). The optics collection system 70 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light at an expected fluorescence wavelength of the data and/or ancilla qubits of the quantum computer 110. In various embodiments, the detectors may be in electronic communication with the quantum system controller 30 via one or more A/D converters 425 (see FIG. 4) and/or the like.

In various embodiments, the quantum computer 110 comprises one or more voltage sources 50. For example, the voltage sources 50 may comprise a plurality of voltage drivers and/or voltage sources and/or at least one RF driver and/or voltage source. For example, in various embodiments, the voltage sources 50 include a plurality of arbitrary waveform generators (AWGs). The voltage sources 50 may be electrically coupled to the corresponding potential generating elements (e.g., electrodes) of the confinement apparatus 120, in an example embodiment.

In various embodiments, a classical computing entity 10 is configured to allow a user to provide input to the quantum computer 110 (e.g., via a user interface of the computing entity 10) and receive, view, and/or the like output from the quantum computer 110. In various embodiments, the classical computing entity 10 is configured to perform one or more classical computations in real-time or near real-time with performance of the quantum circuit by the quantum computer 110. For example, during the performance of the quantum circuit, the controller 30 may provide one or more syndromes of one or more logical qubits and the classical computing entity 10 determines and provides one or more corresponding quantum error corrections such that the controller 30 can perform the quantum error correction in real-time while the quantum circuit is being performed.

The classical computing entity 10 is referred to as "classical" herein as the classical computing entity 10 uses semiconductor-based hardware to perform classical computing operations. The classical computing entity 10 may be in communication with the quantum system controller 30 of the quantum computer 110 via one or more wired or wireless networks 20 and/or via direct wired and/or wireless communications. In an example embodiment, the classical computing entity 10 may translate, configure, format, and/or the like information/data, quantum computing algorithms and/or circuits, and/or the like into a computing language, executable instructions, command sets, and/or the like that the quantum system controller 30 can understand and/or implement. For example, the controller 30 is configured to generate machine code level commands configured to, when executed by the appropriate components of the quantum computer 110, cause the performance of a quantum circuit by the quantum computer 110. In various embodiments the classical computing entity 10 may provide quantum computing algorithms and/or circuits in a computing language that the quantum system controller 30 resolves into operations and/or individual or sets of machine code level commands.

In various embodiments, the classical computing entity 10 and the controller 30 are communicatively coupled in a low delay manner. For example, the controller 30 may be configured to call classical operations, programs, modules, functions, and/or the like operating on the classical computing entity 10 (e.g., using a foreign function interface (FFI), application program interface (API), or other appropriate interface). The results of these exchanges between the controller 30 and the classical computing entity 10 may be used to dynamically change and/or affect the quantum circuit performed by the quantum processor 115 in real-time, mid-circuit, and/or the like. Therefore, latency in communication between the classical computing entity 10 and the controller 30 is minimized, in an example embodiment.

In various embodiments, the quantum system controller 30 is configured to control the voltage sources 50, cryostat system and/or vacuum system controlling the temperature and pressure within the cryostat and/or vacuum chamber 40, manipulation sources 60, and/or other systems controlling various environmental conditions (e.g., temperature, pressure, and/or the like) within the cryostat and/or vacuum chamber 40 and/or configured to manipulate and/or cause a controlled evolution of quantum states of one or more manipulatable objects within the confinement apparatus 120. For example, the quantum system controller 30 may cause a controlled evolution of quantum states of one or more manipulatable objects within the confinement apparatus 120 to execute a quantum circuit and/or algorithm. For example, the quantum system controller 30 may cause a reading procedure comprising coherent shelving to be performed, possibly as part of executing a quantum circuit and/or algorithm. Additionally, the quantum system controller 30 is configured to communicate and/or receive input data from the optics collection system 70 and corresponding to the reading of the quantum state of physical data qubits and/or ancilla qubits of the quantum computer 110. In various embodiments, the manipulatable objects confined within the confinement apparatus 120 are used as data and/or ancilla qubits of the quantum computer 110. In various embodiments, the data qubits are organized into logical qubits and the ancilla qubits are used to non-invasively probe the data qubits and/or logical qubits.

In various embodiments, performance of a quantum circuit comprises the performance of one or more quantum error correction cycles. During a quantum error correction cycle, one or more syndrome circuit segments are performed so as to generate and/or extract syndromes from one or more logical qubits used in performance of the quantum circuit. A syndrome circuit segment is performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the respective data qubit of the logical qubit and the respective ancilla qubit are disposed within the respective interaction zone and a respective at-least-two-physical-qubits interaction is performed thereon. The interactions between the respective ancilla qubit and one or more data qubits of logical qubit causes information regarding the one or more data qubits of the logical qubit to be encoded by the ancilla qubit in a non-invasive manner (e.g., without destroying the coherence of the one or more data qubits). Thus, the state of the ancilla qubit can be used to determine and/or extract a syndrome of the logical qubit.

FIG. 2A illustrates a top view of a portion of a confinement apparatus 120 at a first time $t_1$ during the performance of a syndrome circuit segment. The illustrated portion of the confinement apparatus 120 includes radio frequency (RF) rails 122A, 122B and three sequences of control electrodes 124A, 124B, 124C. Each sequence of control electrodes 124 comprises a plurality of control electrodes 126.

In various embodiments, RF voltage sources of the voltage source 50 generate and provide an RF voltage signal that is applied to the RF rails 122A, 122B to generate a pseudopotential that defines one or more linear confinement regions (e.g., a 2 or 3-dimensional array of 1-dimensional confinement regions). The manipulatable objects confined by the confinement apparatus 120 are confined in the one or more linear confinement regions.

The manipulatable objects may be transported between different locations of the confinement apparatus 120 through the application of sets of voltage signal sequences to the control electrodes 126. For example, a time $t_1$, an manipulatable object used as a first data qubit 5A and a manipulatable object used as an ancilla qubit 8 are disposed within an interaction zone 128 of the confinement apparatus 120. The first data qubit 5A is part of a logical qubit and an at-least-two-physical-qubits interaction may be performed on the first data qubit 5A and the ancilla qubit 8 as part of a syndrome circuit segment to generate, determine, and/or extract a syndrome of the logical qubit.

At the first time $t_1$, a second data qubit 5B is located outside of the interaction zone 128. After performance of the at-least-two-physical-qubits interaction on the on the first data qubit 5A and the ancilla qubit 8, the first data qubit 5A is transported out of the interaction zone 128 and the second data qubit 5B is transported into the interaction zone 128. For example, as shown in FIG. 2B, at a second time $t_2$, second data qubit 5B and the ancilla qubit 8 are disposed within the interaction zone 128 and the first data qubit is located outside of the interaction zone 128. An at-least-two-physical-qubits interaction may then be performed on the second data qubit 5B and the ancilla qubit 8 as part of the performance of the syndrome circuit segment.

Example Operation of a Quantum Computing System

Figure 3:
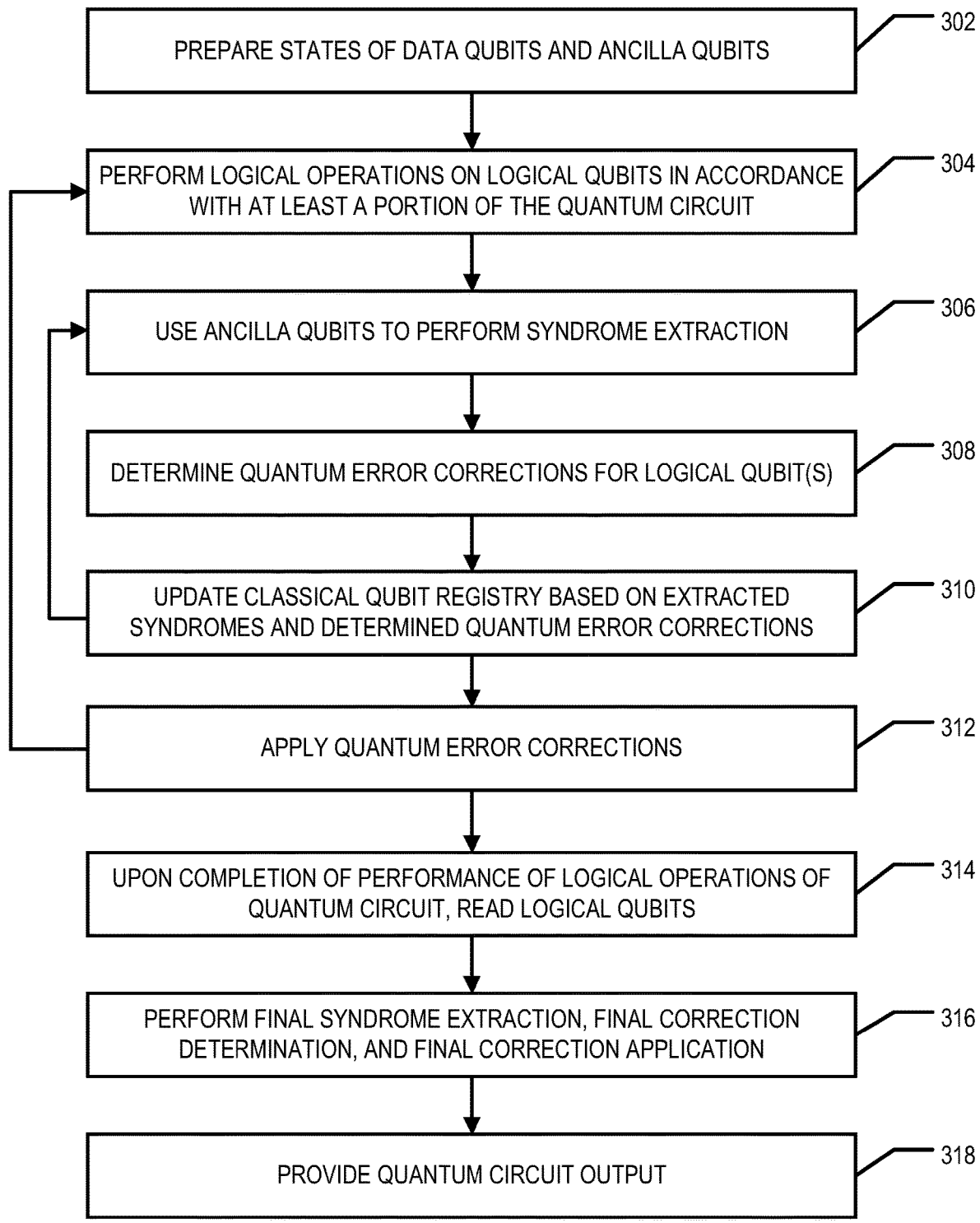

FIG. 3 is a flowchart illustrating various processes, operations, and/or procedures performed by a quantum computing system, such as the quantum computing system 100, for example, to perform a quantum circuit, according to various embodiments. For example, a quantum circuit may be obtained by the controller 30 (e.g., accessed from memory 410, received via communication interface 420, and/or the like (See FIG. 4)), compiled, and/or the like. The controller 30 may then cause the quantum computing system 100 (possibly due to user input received via the classical computing entity 10 and/or via a user interface of the controller 30) to begin executing the quantum circuit.

Starting at block 302, the states of the physical qubits are prepared. As used herein term physical qubits refers to qubits that are embodied by a respective manipulatable object. Respective physical qubits are data qubits or ancilla qubits. For example, the data qubits and the ancilla qubits are examples of the physical qubits. The one or more logical qubits each comprise a respective plurality of data qubits and each form a respective binary logical element of the quantum processor.

In various embodiments, the controller 30 controls operation of the voltage sources 50 to generate and provide voltage signals that causes physical qubits to be transported into and out of respective interaction zones defined by the quantum processor 115 (e.g., locations of the confinement apparatus 120 that are configured to have respective manipulation signals intersect therewith such that physical qubits located in the interaction zones are affected by the respective manipulation signals). The controller 30 further controls operation of one or more manipulation sources 60 such that respective manipulation signals are provided to respective interaction zones defined by the quantum processor to prepare the respective quantum states of the respective physical qubits. For example, in various embodiments, the state preparation comprises causing the quantum state of one or more physical qubits to be a known state of defined two state qubit space of the energy structure of the respective manipulatable objects.

In an example embodiment, the state preparation operation is not fault tolerant. However, as no quantum information has yet been encoded into the data qubits at this point in performing the quantum circuit (e.g., the performance of logical gates on the physical and/or logical qubits for which state preparation is being performed has not yet begun), the state preparation operation can be performed as a repeat-until-success circuit segment, ensuring in real-time that the state of the respective qubit is fault tolerantly prepared. For example, execution of a syndrome circuit segment may be used to determine whether the state preparation operation was performed successfully.

At step/operation 304, one or more logical operations are performed on logical qubits in accordance with at least a portion of the quantum circuit. For example, the controller 30 may cause the quantum processor 115 to perform one or more logical operations on logical qubits of the quantum processor 115 in accordance with the quantum circuit. For example, performing the one or more logical operations on the logical qubit(s) comprises transporting one or more data qubits of the logical qubit(s) into and/or out of respective interaction zones, causing interactions between respective data qubits of the logical qubit(s), performing single and/or at-least-two-physical-qubits gates (e.g., gates that cause interaction of two or more physical qubits) on respective data qubits of the logical qubit(s), and/or the like, in accordance with the quantum circuit. In various embodiments, the physical qubits (data qubits and ancilla qubits) of the quantum computer system 100 may be physically transportable within the confinement apparatus 120 such that any selected pair of physical qubits may be transported into a same interaction zone and interacted with on another (e.g., have a two qubit gate performed thereon). For example, the quantum circuit indicates which gates are to be performed on which logical qubits and in which order.

In various embodiments, the performed gates are transversal gates. For example, a single qubit gate is performed on a logical qubit by performing corresponding single qubit gates on each of the plurality of data qubits of the logical qubit in series, parallel, and/or a combination thereof. In various embodiments, a two qubit gate is performed on a first logical qubit and a second logical qubit by causing corresponding two qubit gates to be performed on respective pairs of first data qubits of the first logical qubit and second data qubits of the second logical qubit.

In various embodiments, at least one non-transversal gate is used. For example, in an example embodiment, the logical gates of the quantum circuit (e.g., single logical gates and/or at least two logical qubits gates) and/or one or more gates of a syndrome circuit segment are non-transversal gates. For example, at least one gate may be used (e.g., in the quantum circuit and/or in a syndrome circuit segment) where a first set of operators is applied to a first subset of data qubits of a logical qubit and a second (different) set of operators is applied to a second subset of data qubits of the logical qubit to perform the gate. For example, in an example embodiment, sets of physical gates that result in the performance of respective logical operations on one or more logical qubits are used to perform logical operations.

At various points during performance of the quantum circuit, syndromes of one or more logical qubits are generated, determined, and/or extracted. In particular, at step/operation 306, ancilla qubits are used to perform syndrome extraction. For example, one or more ancilla qubits are used to non-invasively probe the data qubits and/or logical qubits. For example, the interactions between a respective ancilla qubit and one or more data qubits of a logical qubit causes information regarding the one or more data qubits of the logical qubit to be encoded by the ancilla qubit in a non-invasive manner (e.g., without destroying the coherence of the one or more data qubits).

In various embodiments, the syndrome extractions are performed through the performance of syndrome circuit segments. Performance of a syndrome circuit segment comprises performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor 115 such that the respective data qubit of the logical qubit and the respective ancilla qubit are disposed within the respective interaction zone. A respective at-least-two-physical-qubits interaction is then performed on the data qubit and the ancilla qubit in the interaction zone such that information regarding the data qubit is encoded to the quantum state of the ancilla qubit without disturbing the quantum state of the data qubit. In various embodiments, performance of a syndrome circuit segment may include performing various aspects of lattice surgery and/or interactions between two or more ancilla qubits.

In various embodiments, a syndrome circuit segment is performed using one or more ancilla qubits and one or more data qubits of a logical qubit to generate, determine, and/or extract a syndrome of the logical qubit. A syndrome circuit is a relatively short circuit (compared to the quantum circuit) configured to encode information regarding one or more data qubits of the logical qubit to the quantum state of one or more ancilla qubits such that the ancilla qubits may be read to determine a syndrome of the logical qubit comprising the one or more data qubits without destroying the coherence and/or quantum information stored in the one or more data qubits of the logical qubit. For example, a syndrome of a logical qubit is configured to provide information regarding the occurrence, location, and/or type of errors experienced by a logical qubit.

For example, one or more quantum error correction cycles may be performed to generate, determine, and/or extract syndromes of one or more logical qubits in a fault tolerant manner. As used herein, fault tolerance refers to design principles that guarantee faults do not spread too quickly through a quantum circuit to become uncorrectable logical errors. For example, each quantum error correction cycle includes the performance of one or more syndrome circuit segments. In various embodiments, generating, determining, and/or extracting the syndromes of one or more logical qubits in a fault tolerate manner comprises performing multiple syndrome extraction cycles for a respective logical qubit and comparing the results of the multiple syndrome extraction cycles. For example, the fault tolerance of the quantum error correction may be a probability-based fault tolerance.

In various embodiments, one or more of the quantum error correction cycles includes a performance of one or more flagged syndrome circuit segments. In an example embodiment, when it is determined that the current value (e.g., quantum state) of an ancilla qubit employed as a flag in the performance of a flagged syndrome circuit for a logical qubit is different from the previous value (e.g., quantum state) of the ancilla qubit employed as the flag in the previous performance of the flagged syndrome circuit for the logical qubit, an unflagged syndrome circuit segment is performed to gather additional information regarding one or more errors experienced by the logical qubit. For example, in an example embodiment, a quantum error decoder (e.g., operating on the classical computing entity 10 and/or controller 30) is called to determine one or more quantum error corrections only when the performance of an unflagged syndrome circuit is triggered. For example, the quantum error decoder is configured to receive a syndrome for a logical qubit generated, determined, and/or extracted using an unflagged syndrome circuit segment to determine one or more quantum error corrections for the logical qubit.

Continuing with FIG. 3, at step/operation 308, one or more respective quantum error corrections for one or more logical qubits are determined based on the respective syndromes generated, determined, and/or extracted therefrom. For example, the one or more syndromes generated, determined, and/or extracted from a logical qubit during the syndrome extraction step (e.g., step/operation 306) are provided to a quantum error decoder operating on the classical computing entity 10 and/or controller 30. The quantum error decoder is a program, application, and/or the like configured to determine one or more quantum error corrections for a logical qubit based on one or more syndromes for a logical qubit. In an example embodiment, a quantum error decoder is embodied as one or more look up tables. In various embodiments, the quantum error decoder is configured to determine one or more quantum error corrections based on one or more syndromes in real time or near real time with respect to receiving the one or more syndromes as input.

In various embodiments, in various scenarios, the quantum error correction determined is an identity operation. For example, when no errors are detected and/or the one or more syndromes for the logical qubit do not indicate the presence of an error, the determined quantum error correction is to not make any adjustments or changes to the qubit. For example, the determined quantum error correction may be to apply a software correction that is equivalent to applying an identity operator to the classical qubit registry corresponding to the logical qubit.

At step/operation 310, a classical qubit registry (e.g., stored in memory 410 and/or memory 922, 924) is updated based on the extracted syndromes and/or the determined quantum error corrections. For example, the controller 30 may cause the extracted syndromes and/or determined quantum error corrections to be tracked (e.g., in classical memory). In an example embodiment, the values of the syndromes (and flags, if relevant) and/or the determined quantum error corrections are stored for the entirety of the performance of the quantum circuit. In an example embodiment, the values of the syndromes and/or the determined quantum error corrections are tracked for windows of time (e.g., of a set temporal or number of logical gates length, until a triggering event is identified and correspond error corrections are applied, and/or the like).

At step/operation 312, the one or more quantum error corrections for the logical qubit are applied to the logical qubit. For example, the controller 30 controls operation of various components (e.g., voltage sources 50, manipulation sources 60, and/or the like) of the quantum processor 115 to cause the one or more quantum error corrections to be applied to the logical qubit. In various embodiments, the quantum error correction(s) comprise software corrections that are applied by tracking quantum errors experienced by a logical qubit in a classical qubit registry corresponding to the logical qubit (e.g., stored in a memory of the controller 30 and/or a memory of the classical computing entity 10), physically applying a correction to one or more data qubits of the logical qubit (e.g., through one or more single and/or two qubit gates applied to various data qubits of the logical qubit), and/or modifying a logical operation performed on one or more data qubits of the logical qubit based at least in part on the determined quantum error correction.

In various embodiments, a quantum error correction is not applied immediately upon determination of the quantum error correction. For example, in various embodiments, syndromes and quantum error corrections are tracked (e.g., in memory 410 and/or memory 922, 924) for a period of time and/or until a triggering event is identified. For example, the syndromes and/or quantum error corrections are tracked in a classical qubit registry, in an example embodiment.

In an example embodiment, the triggering event corresponds to the determination that a logical gate that does not commute with one or more of the quantum error corrections (e.g., a non-Clifford gate, in an example embodiment) is to be performed on a logical qubit. For example, it may be determined that the controller has scheduled and/or the quantum circuit dictates the upcoming performance of a logical gate that does not commute with one or more of the quantum error corrections (e.g., a non-Clifford gate, in an example embodiment) on the logical qubit. Upon identification of the triggering event, any required physical corrections may be scheduled (ahead of the performance of the gate that does not commute with the one or more quantum error corrections) and/or the performance of the gate that does not commute with the one or more quantum error corrections may be scheduled in modified manner such that the performance of the gate is modified to account for and/or include one or more quantum error corrections.

As should be understood, some quantum error corrections are updates of the classical representation of the Pauli frame of the qubit and are applied to the logical qubit through an update to the classical qubit registry (e.g., a software quantum error correction).

In various embodiments, the process of performing one or more logical operations on one or more logical qubits, performing syndrome generation/determination/extraction, determining quantum error corrections, and applying the quantum error corrections are repeated a plurality of times until the logical operations of the quantum circuit are completed. For example, completing a quantum circuit may include state preparation of physical qubits, performance of logical operations, performance of quantum error correction cycles, performance of logical operations, performance of quantum error correction cycles, performance of logical operations, performance of quantum error correction cycles, . . . , and, once all of the logical operations of the quantum circuit have been performed, reading of the logical qubits. As should be understood, in various embodiments, state preparation of the ancilla qubits is performed between each quantum error correction cycle and/or between performance of quantum error correction cycles for different logical qubits, in an example embodiment.

Thus, once it is determined that all of the logical operations of the quantum circuit have been performed, the process continues to step/operation 314. At step/operation 314, one or more of the logical qubits are read, in accordance with the quantum circuit. For example, the data qubits of a logical qubit may be transported (in serial and/or in parallel)

into respective reading zones (which may or may not be the same physical portions of the confinement apparatus 120 as the interaction zone 128). The respective data qubits may be rotated into desired reading frames, in accordance with the quantum circuit and read.

For example, a reading operation may include a manipulation signal being incident upon a physical qubit (e.g., a data qubit). Depending on which state of the two state qubit space that the physical qubit is in, the physical qubit will either fluoresce in response to the manipulation signal being incident thereon, or will not fluoresce. Based on the fluorescence observed (or not observed) by the optics collection system 70, the quantum state of the physical qubit is determined. Based on the quantum states of the data qubits of a logical qubit, the state of the logical qubit is determined. The state of the logical qubit is then used to determine a result of the quantum circuit.

At step/operation 316, in various embodiments a final syndrome extraction, final correction determination, and final correction application is performed. For example, the final syndrome(s) of a logical qubit is determined based on the result of reading the data qubits of the logical qubit. For example, the distribution of quantum states of the data qubits of the logical qubit provides an indication of errors experienced by the logical qubit. The final syndrome(s) of the logical qubit are then used (e.g., by the quantum error decoder) to determine a final correction. In various embodiments, the final correction is a software quantum error correction. For example, as the data qubits have been read, the quantum information stored by the data qubits has been destroyed. Thus, no physical correction can be applied. For example, the final correction is a software correction such as a Pauli frame rotation, in an example embodiment. the Final correction is applied by updating a classical qubit registry corresponding to the logical qubit based on the final correction.

At step/operation 318, after the respective final corrections have been applied to each of the logical qubits, the output of the quantum circuit is provided. For example, the controller 30 may provide the output of the quantum circuit to the classical computing entity 10. In another example, the classical computing entity 10 may provide an indication of the output of the quantum circuit via a user interface thereof (e.g., display 916) and/or transmit an indication of the output of the quantum circuit to another computing entity (e.g., via transmitter 904 and/or network interface 920).

Example Controller of a Quantum Computing System

In various embodiments, a quantum computer 110 comprises a quantum system controller 30 and a quantum processor 115. The quantum system controller 30 is configured to control various components of a quantum processor 115. For example, the controller 30 is configured to control the operation of components of the quantum processor 115 to cause the performance of a quantum circuit including a plurality of quantum error correction cycles. For example, various embodiments are configured to perform one or more quantum error corrections for one or more data qubits in real-time and/or near real-time with respect to the occurrence of one or more quantum errors experienced by the one or more data qubits, which may be evaluated as a conditional block.

In various embodiments, the quantum system controller 30 is in communication with an optics collection system 70 such that the quantum system controller 30 is configured to receive input data captured and/or generated by the optics collection system 70. The quantum system controller 30 is further configured to perform quantum error correction via a software-based correction and/or via the physical application of a quantum error correction to one or more qubits (e.g., by controlling of one or more voltage sources 50 and/or manipulation sources 60). In various embodiments, the quantum system controller 30 is further configured to control a cryostat system and/or vacuum system controlling the temperature and pressure within the cryostat and/or vacuum chamber 40, cooling system, and/or other systems controlling the environmental conditions (e.g., temperature, humidity, pressure, and/or the like) within the cryostat and/or vacuum chamber 40.

As shown in FIG. 4, in various embodiments, the quantum system controller 30 may comprise various quantum system controller elements including processing element(s) 405, memory 410, driver controller elements 415, a communication interface 420, analog-digital (A/D) converters 425, and/or the like. In various embodiments, the quantum system controller 30 is configured to receive input data generated by the optics collection system via the A/D converter(s) 425. In various embodiments, the processing element(s) 405 are configured to operate as described herein. In various embodiments, the quantum system controller 30 may include additional quantum system controller elements configured to perform various functions described herein. In an example embodiment, the controller 30 is similar to the controller described in U.S. Application No. 63/235,022, filed Aug. 19, 2021, the content of which is incorporated herein by reference in its entirety.

In various embodiments, the processing element(s) 405 comprises one or more processing devices such as processors, programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing elements and/or circuitry, and/or the like. The term circuitry may refer to an entirely hardware embodiment or a combination of hardware and computer program products. In an example embodiment, a processing element 405 of the quantum system controller 30 comprises a clock and/or is in communication with a clock.

In various embodiments, the memory 410 comprises non-transitory memory such as volatile and/or non-volatile memory storage such as one or more of hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 410 may store a queue of commands to be executed to cause a quantum algorithm and/or circuit to be executed (e.g., an executable queue), qubit records corresponding the qubits of quantum computer (e.g., in a qubit record data store, qubit record database, qubit record table, and/or the like), a calibration table, computer program code (e.g., in a one or more computer languages, specialized quantum system controller language(s), and/or the like), and/or the like. In an example embodiment, execution of at least a portion of the computer program code stored in the memory 410 (e.g., by a processing element 405) causes the quantum system controller 30 to perform one or more steps, operations, processes, procedures and/or the like for generating one or more sets of commands configured to cause the quantum processor 115 to perform at least a portion of a quantum circuit; to update one or more qubit registries; and/or the like. In an example embodiment, execution of at least a portion of the computer program code stored in the memory 410 causes the quantum system controller 30 to cause one or more commands to be performed. In various embodiments, the compute program code stored in the memory 410 comprises quantum assembly (QASM) and/or quantum intermediate representation (QIR) code and/or binary and/or machine code generated by compiling QASM and/or QIR code.

In various embodiments, the driver controller elements 415 include one or more drivers and/or quantum system controller elements each configured to control one or more drivers. In various embodiments, the driver quantum system controller elements 415 may comprise drivers and/or driver controllers. For example, the driver controllers may be configured to cause one or more corresponding drivers to be operated in accordance with executable instructions, commands, and/or the like generated, scheduled. and executed by the quantum system controller 30. For example, the processing element 4205 may generate one or more commands to be performed by a first driver.

In various embodiments, the driver controller elements 415 enable the quantum system controller 30 to operate a voltage sources 50, manipulation sources 60, cooling system, vacuum systems, and/or the like. In various embodiments, the drivers may be laser drivers (e.g., configured to operate and/or control one or more manipulation sources 60); vacuum component drivers; drivers for controlling the flow of current and/or voltage applied to electrodes (e.g., configured to operate and/or control one or more voltage sources 50) used for maintaining and/or controlling the trapping potential of the confinement apparatus 120 (and/or other drivers for providing driver action sequences to potential generating elements of the confinement apparatus); cryostat and/or vacuum system component drivers; cooling system drivers, and/or the like.

Each driver controller element 415 corresponds to an endpoint within the system (e.g., a component of a manipulation source 60, a component of a voltage source 50 (radio frequency voltage sources, arbitrary waveform generators (AWG), direct digital synthesizer (DDS), and/or other waveform generator), a component of a cooling and/or vacuum system, a component of the optics collection system 70, and/or the like). Each endpoint within the quantum computer 110 represents an individual hardware control. Each endpoint has its own set of accepted micro-commands, in various embodiments. Examples include but are not limited to a voltage source 50 such as a direct digital synthesizer (DDS), component of an optics collection system 70 such as a photomultiplier tube (PMT), a component of a manipulation source 60 such as a laser driver and/or optical modulator switch, and/or general-purpose output (GPO). Individual commands for a DDS allow for setting power level, frequency and phase of a controlling signal generated thereby. Commands for a PMT interface include start/stop photon count and reset of count, in various embodiments. Commands for a GPO endpoint include setting and/or clearing one or more output lines. These output lines can be used to control external hardware in a manner synchronized with the quantum circuit execution.

In various embodiments, the quantum system controller 30 comprises means for communicating and/or receiving signals from one or more optical receiver components (e.g., of the optics collection system 70). For example, the quantum system controller 30 may comprise one or more analog-digital (A/D) converter 425 configured to receive signals from one or more optical receiver components (e.g., a photodetector of the optics collection system 70), calibration sensors, and/or the like. In various embodiments, the A/D converter 425 are configured to write the input data generated by converting the received signals generated by one or more optical receiver components of the optics collection system 70 to memory 410.

In various embodiments, the quantum system controller 30 may comprise a communication interface 420 for interfacing and/or communicating with, for example, a classical computing entity 10. For example, the quantum system controller 30 may comprise a communication interface 420 for receiving executable instructions, command sets, and/or the like from the computing entity 10 and providing output received from the quantum computer 110 (e.g., from an optics collection system 70) and/or the result of a processing the output to the computing entity 10. In various embodiments, the computing entity 10 and the quantum system controller 30 may communicate via a direct wired and/or wireless connection and/or via one or more wired and/or wireless networks 20.

Example Operation of a Controller of Quantum Computing System

Figure 5:
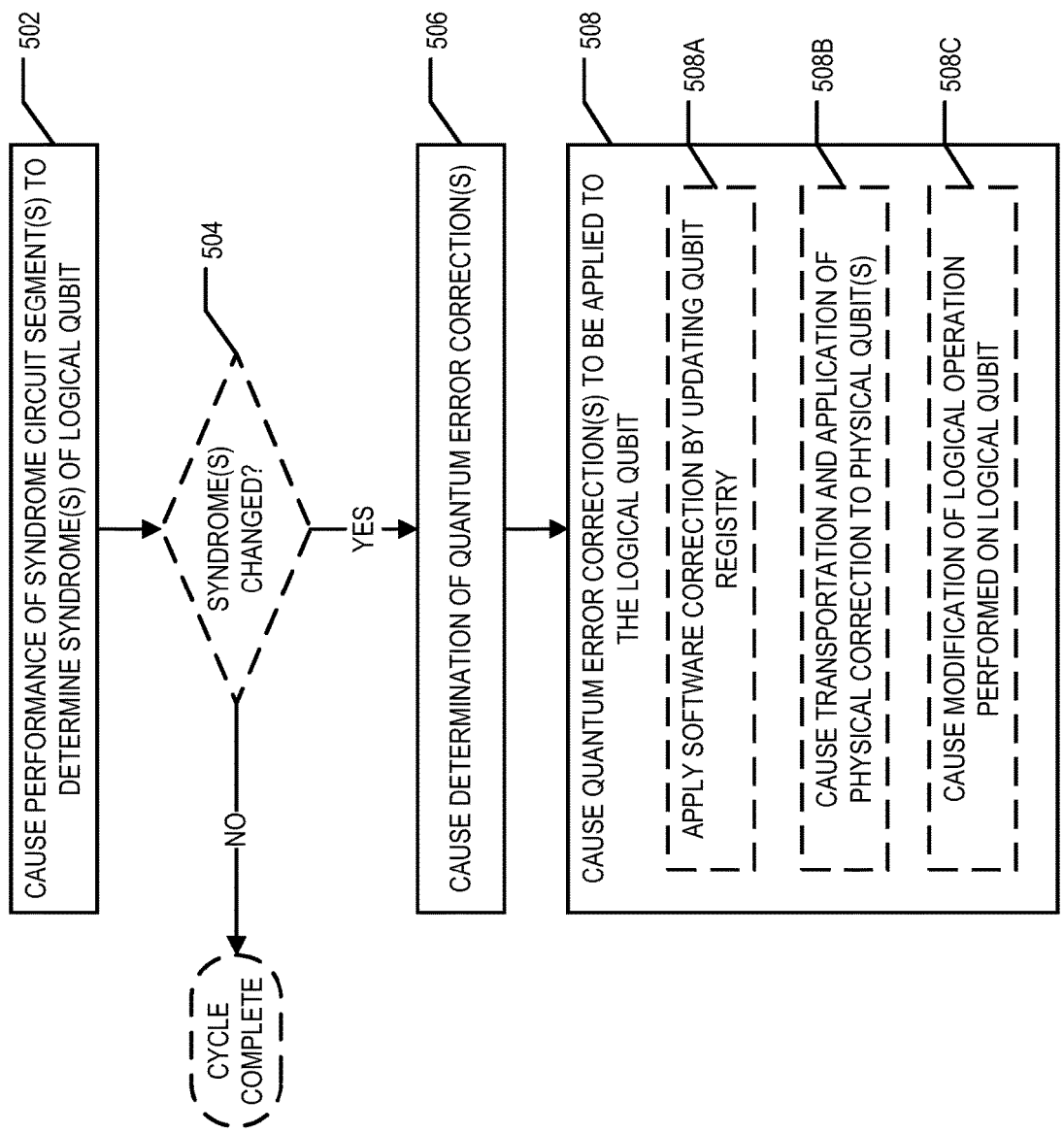
FIG. 5 is a flowchart illustrating various processes, operations, and/or procedures performed by a controller, such as the controller of FIG. 4, for example, to perform a quantum error correction cycle, according to various embodiments.

FIG. 5 is a flowchart illustrating various processes, operations, and/or procedures performed by a controller 30, for example, to perform a quantum error correction cycle, according to various embodiments. For example, the processes, operations, and/or procedures illustrated in FIG. 5 are performed at various times during the performance of a quantum circuit, in various embodiments.

Starting at step/operation 502, the controller 30 causes performance of one or more syndrome circuit segments to determine one or more respective syndromes for one or more logical qubits. For example, the controller 30 comprises means, such as processing element 405, memory 410, driver controller elements 415, A/D converters 425, and/or the like, for causing performance of one or more syndrome circuit segments to determine one or more respective syndromes for one or more logical qubits.

For example, the quantum computer system 100 may be performing a quantum circuit comprising one to several hundreds or thousands of logical qubits. Each of the logical qubits comprises a plurality of data qubits each embodied as a respective manipulatable object that is physically transportable within the confinement apparatus 120. For example, the physical qubits (data qubits and ancilla qubits) of the quantum computer system 100 may be physically transportable within the confinement apparatus 120 such that any selected pair of physical qubits may be transported into a same interaction zone and interacted with on another (e.g., have a two qubit gate performed thereon). In other words, the quantum processor 115 has a reconfigurable physical qubit register. This feature of the quantum computer system 100 is referred to herein as all-to-all connectivity. In various embodiments, the controller 30 causes a syndrome circuit segment to be performed at least in part by causing performance of a sequence of transportation operations and at-least-two-physical-qubits interactions. Each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor 115 such that the respective data qubit of the logical qubit and the respective ancilla qubit are disposed within the respective interaction zone and a respective at-least-two-physical-qubits interaction is performed thereon (e.g., possibly by causing appropriate manipulation signals to be incident on the data qubit and/or the ancilla qubit within the interaction zone).

In particular, the interactions between the data qubit and the ancilla qubit are configured to not destroy the quantum information stored by the data qubit and to encode information corresponding to the data qubit (and/or the data qubits of the logical qubit as a whole) into the quantum state of the ancilla qubit. For example, a syndrome circuit segment may include the performance of one or more two qubit gates referred to as controlled not (CNOT) gates on respective data qubits and ancilla qubits.

In various embodiments, a syndrome circuit segment ends with the reading of the one or more ancilla qubits used in the syndrome circuit segment. For example, the quantum state of one or more ancilla qubits used to perform the syndrome circuit segment may be read and/or determined. The controller 30 receives signals from the optics collection system 70 indicating the results of the reading the one or more ancilla qubits used to perform the syndrome circuit segment. Based on the received signals, the controller 30 determines the one or more syndromes of a respective logical qubit, in an example embodiment. In another embodiment, the controller 30 provides an indication of the respective quantum states of the one or more ancilla qubits used to perform the syndrome circuit segment to the classical computing entity 10 and the classical computing entity 10 determines the one or more syndromes of a respective logical qubit. In an example embodiment, a syndrome is a set of binary values (e.g., the binary values read from the one or more ancilla qubits), a function of the values read from the one or more ancilla qubits, and/or the like.

In various embodiments, the syndrome(s) determined for a respective logical qubit by performance of a syndrome circuit segment are compared to the previously known value of the syndrome. For example, the syndrome(s) determined for a respective logical qubit may be compared to the initial value (e.g., prepared states) of the ancilla qubits for the first quantum error correction cycle of the quantum circuit. For example, the syndrome(s) determined for a respective logical qubit may be compared to the immediately previously determined value of the syndrome(s) for the respective logical qubit. For example, it may be determined if the value of the syndrome has changed since the value of the syndrome was last determined.

For example, in an example embodiment, at step/operation 504, the controller 30 determines whether the value of the syndrome(s) determined for the respective logical qubit through performance of the syndrome circuit segment at step/operation 502 has changed (e.g., from the (immediately) previously known value). In an example embodiment, the controller 30 may cause the classical computing entity 10 to determine whether the value of the syndrome(s) determined for the respective logical qubit through performance of the syndrome circuit segment has changed. For example, providing the syndrome(s) and/or information from which the syndrome(s) may be determined to the classical computing entity 10 may trigger the classical computing entity 10 to determine whether the value of the syndrome(s) for the respective logical qubit has changed.

For example, the controller 30 and/or the classical computing entity 10 stores a classical qubit registry (e.g., in memory 410 and/or memory 922, 924) that includes information corresponding to the respective logical qubit. The classical qubit registry is referred to herein as "classical" because it is a data structure stored by a classical (e.g., semiconductor-based) memory and so as to distinguish the classical qubit registry (stored in memory 410 and/or memory 922, 924) from the physical qubit register. For example, the classical qubit registry corresponding to a respective logical qubit may include information identifying the data qubits that make up the respective logical qubit, an organization of the data qubits that make up the respective logical qubit, one or more previously determined syndrome values for the respective logical qubit, one or more software corrections (e.g., Pauli frame rotations and/or the like) applied to the respective logical qubit, a tracking of quantum error corrections to be physically performed on the respective logical qubit at a future point in time, and/or the like. The controller 30 and/or classical computing entity 10 compares the determined syndrome(s) for the respective logical qubit to the syndrome value(s) for the respective logical qubit stored in the classical qubit registry corresponding to the respective logical qubit to determine whether the value of the syndrome(s) has changed.

In various embodiments, the controller 30 comprises means, such as processing elements 405, memory 410, communication interface 420, and/or the like, for determining whether the syndrome(s) for the respective logical qubit has changed and/or for causing determination of whether the syndrome(s) for the respective logical qubit has changed.

In an example embodiment, when it is determined at step/operation 504 (and/or responsive to determining at step/operation 504) that the syndrome(s) for the respective logical qubit has not changed, the quantum error correction cycle for the respective logical quit is determined to be complete. For example, in an example embodiment, when it is determined that the syndrome(s) for the respective logical qubit has not changed, it is determined that no quantum error correction for the respective logical qubit need be determined and/or applied.

In an example embodiment, when it is determined at step/operation 504 (and/or responsive to determining at step/operation 504) that the syndrome(s) for the respective logical qubit has changed, the process continues to step/operation 506.

At step/operation 506, the controller 30 determines and/or causes determining of one or more quantum error corrections for the respective logical qubit based at least in part on the syndrome(s) for the respective logical qubit generated, determined, and/or extracted at step/operation 502. For example, the controller 30 may operate a quantum error decoder or cause the classical computing entity 10 to operate a quantum error decoder to determine one or more quantum error corrections for the respective logical qubit. the one or more quantum error corrections may be determined based on the value of the syndrome(s) for the respective logical qubit, the change(s) to the syndrome(s) for the respective logical qubit, and/or the like. In various embodiments, the quantum error decoder is configured to determine one or more quantum error corrections based on one or more syndromes in real time or near real time with respect to receiving the one or more syndromes as input. In an example embodiment, a quantum error decoder is embodied as one or more look up tables.

For example, the controller 30 comprises means, such as processing element 405, memory 410, communication interface 420, and/or the like for determining and/or causing determination of one or more quantum error corrections for the respective logical qubit based at least in part on the syndrome(s) for the respective logical qubit.

In various embodiments, the controller 30 is configured to call one or more classical programs, modules, operations, functions, and/or the like (e.g., operating on the classical computing entity 10). For example, the controller 30 may use a foreign function interface (FFI) to call a quantum error decoder (e.g., operating on the classical computing entity 10) and one or more syndrome(s) for a respective logical qubit to the quantum error decoder. In response, the controller may receive (e.g., via an FFI response or an FFI call) one or more quantum error corrections for the respective logical qubit.

At step/operation 508, the controller 30 causes the one or more quantum error corrections to be applied to the logical qubit. For example, the controller 30 comprises means, such as processing element 405, memory 410, driver controller elements 415, communication interface 420, and/or the like, for causing the one or more quantum error corrections to be applied to the logical qubit. In various embodiments, the quantum error correction is applied prior to further performance of the quantum circuit and/or tracked to be applied at a later point in time during the performance of the quantum circuit, as appropriate for the quantum error correction and/or the quantum circuit. In various embodiments, the one or more quantum error corrections to be applied to the logical qubit include a first quantum error correction to be performed on a first subset of data qubits of the logical qubit, a second quantum error correction to be performed on a second subset of data qubits of the logical qubit, and/or the like. In an example embodiment, the first subset of data qubits and the second subset of data qubits do not overlap (e.g., the two subsets have a null intersection) and the first quantum error correction is different from the second quantum error correction.

For example, at step/operation 508A, the controller 30 applies and/or causes application of a software quantum error correction. For example, the classical qubit registry corresponding to the respective logical qubit (stored in memory 410 and/or memory 922, 924) may be updated. For example, one or more Pauli frame rotations may be added to and/or applied to the classical qubit registry corresponding to the respective logical qubit and/or an element thereof.

For example, at step/operation 508B, the controller 30 physically applies one or more quantum error corrections to one or more data qubits of the respective logical qubit. For example, one or more single or two qubit gates may be performed on one or more data qubits of the respective logical qubit. For example, one or more data qubits may be transported to respective interaction zones and have interactions performed thereon (e.g., through application of appropriate manipulation signals) to cause one or more quantum error corrections to be applied to the one or more data qubits. In various embodiments, the transportation and interaction operations of physically applying the quantum error corrections to the one or more data qubits are performed in parallel, serially, and/or a combination thereof. For example, the physical application of a quantum error correction may cause rotating of one or more data qubits of the respective logical qubit, modifying the phase of a respective quantum state of one or more data qubits of the respective logical qubit, and/or the like.

For example, at step/operation 508C, the controller 30 modifies one or more logical operations to be performed on the respective logical qubit based at least in part on the determine quantum error correction(s). For example, the controller 30 may cause a single or two qubit gate to be performed on the respective logical qubit (and/or one or more data qubits thereof) to be rotated with respect to the reference frame of the respective logical qubit (and/or one or more data qubits thereof).

Figure 6:
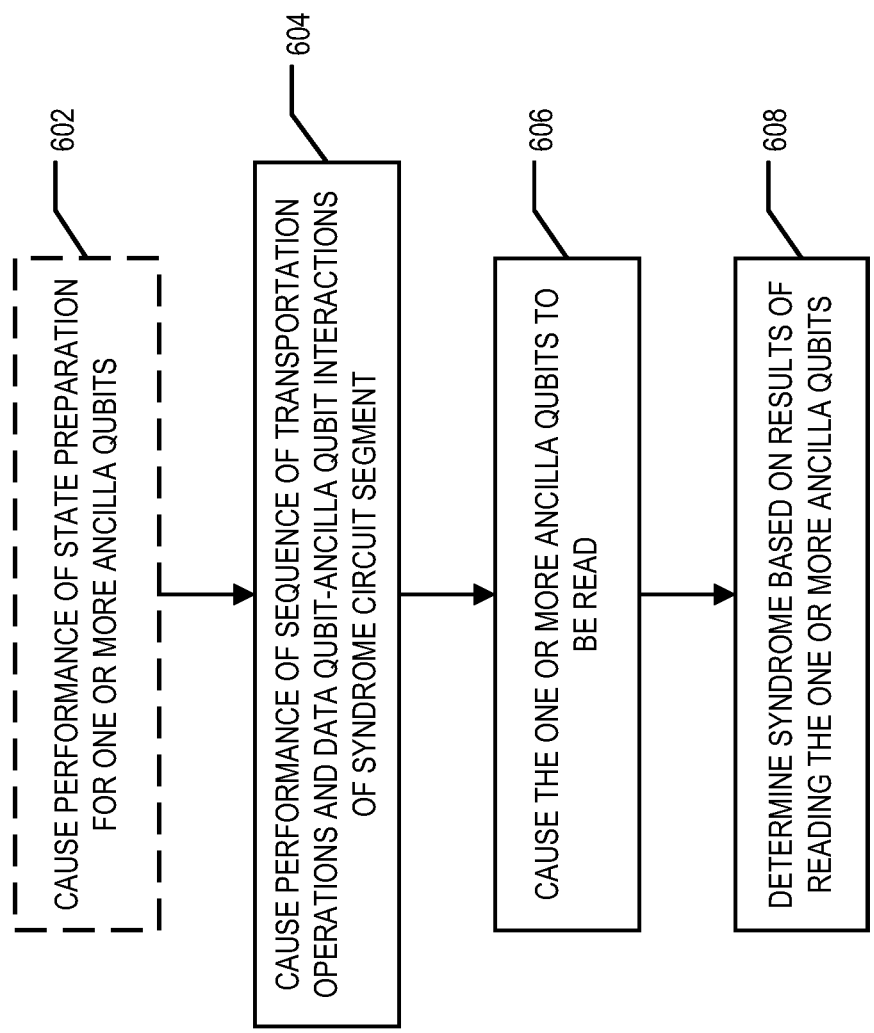
FIG. 6 is a flowchart illustrating various processes, operations, and/or procedures performed by a controller, such as the controller of FIG. 4, for example, to determine a syndrome of a logical qubit, according to various embodiments.

FIG. 6 is a flowchart illustrating various processes, operations, and/or procedures performed by a controller 30, for example, to determine a syndrome of a logical qubit, according to various embodiments. For example, the processes, operations, and/or procedures of FIG. 6 may be performed as part of step/operation 502, in an example embodiment.

Starting at step/operation 602, the controller 30 causes the performance of a state preparation operation on one or more ancilla qubits. For example, the performance of a state preparation operation on an ancilla qubit causes the quantum state of the ancilla qubit to be a known state (e.g., a particular state of the two state qubit space). For example, the controller 30 may control operation of one or more voltage sources 50, manipulation sources 60, and/or the like to cause the one or more ancilla qubits to be located in appropriate locations of the confinement apparatus 120 such that the one or more manipulation signals are incident on respective ones of the one or more ancilla qubits such that the respective quantum states of the one or more ancilla qubits are caused to be in a known state.

In various embodiments, one or more ancilla qubits may be used to generate, determine, and/or extract syndromes from a plurality of logical qubits. For example, an ancilla qubit is used to perform syndrome circuit segments for two or more logical qubits of the plurality of logical qubits, in an example embodiment. In such embodiments, previous syndrome values are stored in a classical qubit registry (stored in memory 410 or memory 922, 924) and the ancilla qubits may be re-initialized through the performance of state preparation operations and used again. This reduces the overall number of physical qubits required to perform a quantum circuit because each logical qubit need not have dedicated ancilla qubits. In various embodiments, this technical improvement is enabled at least in apart by the all-to-all connectivity of the physical qubits.

At step/operation 604, the controller 30 causes the performance of a sequence of transportation operations and at-least-two-physical-qubits interactions in accordance with the syndrome circuit segment. In various embodiments, the specific sequence of transportation operations and at least two physical qubit interactions is controlled by the locations of each of the physical qubits of the quantum processor 115 at the time the syndrome circuit segment is initiated and the particular interactions required by the syndrome circuit segment. In various embodiments, an at least two physical qubit interaction may be a two or more ancilla qubit interaction, a two or more data qubit interaction, an at least one ancilla qubit and at least one data qubit interaction, and/or the like, in accordance with the quantum circuit and/or syndrome circuit segment.

Each transportation operation of the sequence of transportation operations and at least two physical qubit interactions causes physical transport of at least one of (a) a respective data qubit of the logical qubit or (b) a respective ancilla qubit into a respective interaction zone defined by the quantum processor such that the respective data qubit of the logical qubit and the respective ancilla qubit are disposed within the respective interaction zone. Each at least two physical qubit interaction of the sequence of transportation operations and at-least-two-physical-qubits interactions causes the non-invasive (e.g., such that the quantum information stored by the data qubit is not destroyed) transference of information regarding the quantum state of the data qubit to the ancilla qubit.

In an example embodiment, an ancilla qubit is maintained within a respective interaction zone and data qubits are transported into and out of the interaction zone to enable the at-least-two-physical-qubits interactions of the syndrome circuit segment.

At step/operation 606, the one or more ancilla qubits are read. For example, the data qubits of the logical qubits may be transported out of the interaction zones containing the ancilla qubits and/or the ancilla qubits may be moved to reading zones defined by the quantum processor 115. The controller 30 then controls operation of one or more manipulation sources 60 to cause one or more appropriate manipulation signals to be incident on each of the ancilla qubits. The controller 30 then controls operation of the optics collection system 70 to observe any fluorescence emitted by the ancilla qubits such that the respective quantum states of the ancilla qubits can be determined.

At step/operation 608, the syndrome(s) of the respective logical qubit are determined based on the quantum states determined for the ancilla qubits through the reading operation. For example, the controller 30 determines a quantum state of each ancilla qubit based on a signal received from an element of the optics collection system 70 corresponding to the location of the respective ancilla qubit. For example, when a photodetector configured to watch the location of a first ancilla qubit observes significant fluorescence during a reading operation of the first ancilla qubit, it is determined that the first ancilla qubit is in a first state of the two state qubit space. When a photodetector configured to watch the location of a second ancilla qubit does not observe significant fluorescence during a reading operation of the second ancilla qubit, it is determined that the second ancilla qubit is in a second state of the two state qubit space. In an example embodiment, a syndrome of the respective logical qubit is a function of the quantum state of one or more of the ancilla qubits. Thus, the controller 30 determines the syndrome(s) for the respective logical qubit based on the respective determined quantum states of the ancilla qubits.

In an example embodiment, a syndrome circuit segment is performed more than once to determine the syndromes generated, determined, and/or extracted through the multiple instances of the syndrome circuit segment are the same or not and/or to determine a representative syndrome based on the multiple instances of performing the syndrome circuit segment. For example, in an example embodiment, steps/operations 602-606 are performed a plurality of times and step/operation 608 includes processing and/or analyzing the distribution of syndromes generated, determined, and/or extracted through the plurality of instances of performing steps/operations 602-606 to determine a representative syndrome(s) for the respective logical qubit. For example, a first syndrome circuit segment may be performed a plurality of times and a distribution of generated, determined, and/or extracted syndromes may be analyzed and/or processed to determine a representative syndrome(s) corresponding to the first syndrome circuit that are to be used in determining a quantum error correction for the respective logical qubit, used to update the classical qubit registry for the respective logical qubit, and/or the like. For example, by repeating the first syndrome circuit segment multiple times, uncertainties in measurements, at-least-two-physical-qubits interactions, reading operations, and/or the like may be "averaged" out.

In an example embodiment, when one or more syndromes generated, determined, and/or extracted from a respective logical qubit through the performance of the syndrome circuit segment differs from the corresponding one or more syndromes stored in the classical qubit registry corresponding to the respective logical qubit (e.g., stored in memory 410 and/or memory 922, 924), the classical qubit registry is updated to reflect and/or include the most recently determined (representative) syndrome(s).

In various embodiments, a number of syndrome circuit segments are performed and a plurality of syndromes are generated, determined, and/or extracted for a respective logical qubit. For example, different syndrome circuit segments are configured to identify and/or characterize different quantum errors that may be experienced by the respective logical qubit. In various embodiments, the controller 30 is programed to be able to perform each of a defined set of syndrome circuit segments. In an example embodiment, during each quantum error correction cycle, each of the syndrome circuit segments of the defined set of syndrome circuit segments are performed. In an example embodiment, a first plurality of syndrome circuit segments are performed and, based on the results thereof, the controller 30 determines whether additional (and possibly which) syndrome circuit segments of the defined set of syndrome circuit segments need to be performed.

Figure 7:
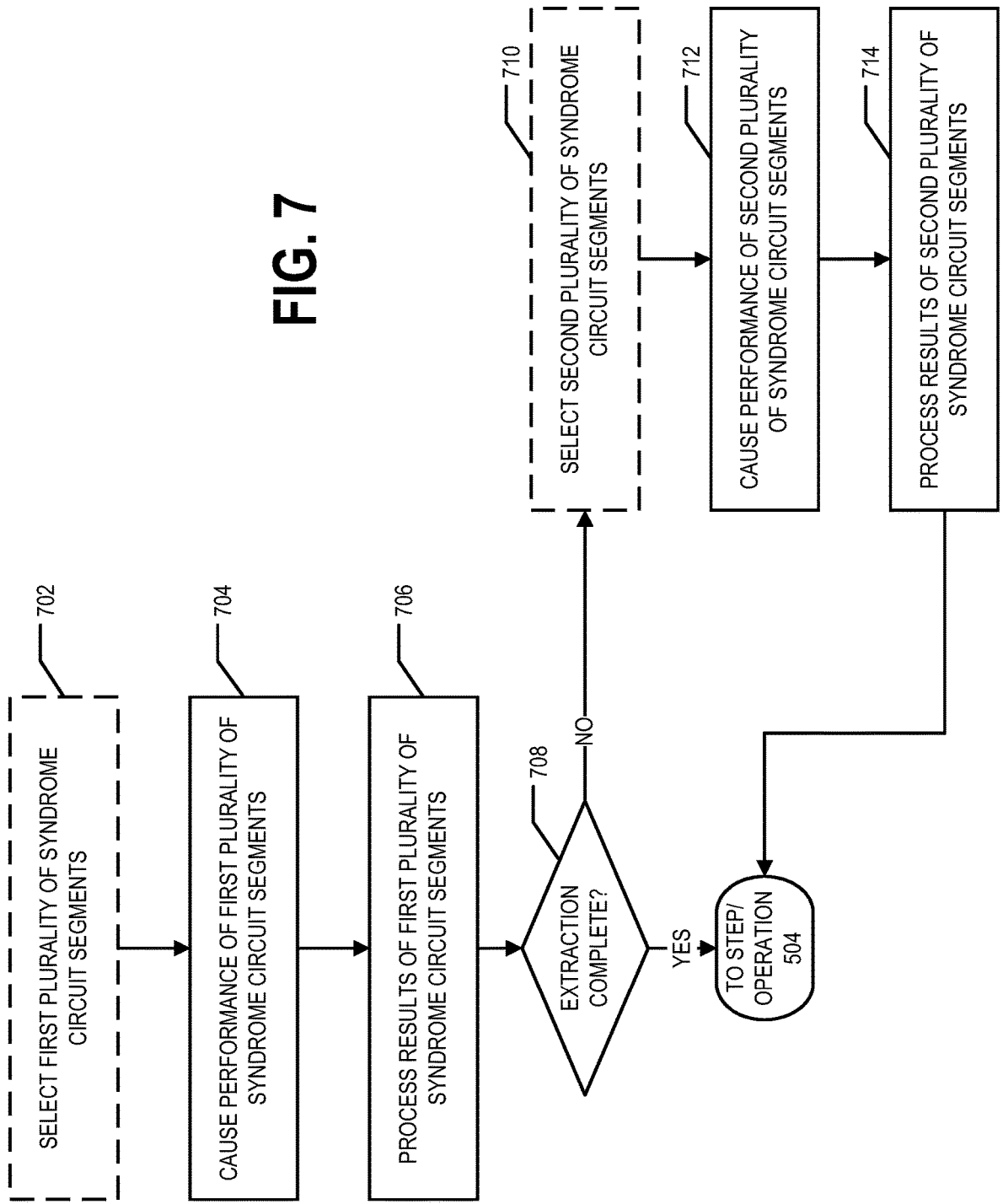
FIG. 7 is a flowchart illustrating various processes, operations, and/or procedures performed by a controller, such as the controller of FIG. 4, possibly in conjunction with a classical computing entity of FIG. 9, for example, to determine syndrome(s) for one or more logical qubits, according to various embodiments.

FIG. 7 is a flowchart illustrating various processes, operations, and/or procedures performed by a controller 30, possibly in conjunction with a classical computing entity 10, for example, to determine syndrome(s) for one or more logical qubits where the results of a first plurality of syndrome circuit segments are used to determine whether and/or which second plurality of syndrome circuit segments are to be performed. In an example embodiment, the processes, operations, and/or procedures of FIG. 7 are performed as part of step/operation 502.

Starting at step/operation 702, a first plurality of syndrome circuit segments are selected from the defined set of syndrome circuit segments. In an example embodiment, the controller 30 and/or classical computing entity 10 selects the first plurality of syndrome circuit segments randomly and/or based on a stochastic process from the defined set of syndrome circuit segments. In an example embodiment, the controller 30 and/or classical computing entity 10 selects the first plurality of syndrome circuit segments from the defined set of syndrome circuit segments based at least in part on one or more syndromes previously generated, determined, and/or extracted from the respective logical qubit or another logical qubit being used in performance of the quantum circuit. For example, the controller 30 and/or classical computing entity 10 selects the first plurality of syndrome circuit segments from the defined set of syndrome circuit segments based at least in part on errors already observed and/or expected to be present in the performance of the quantum circuit. In an example embodiment, the first plurality of syndrome circuit segments are selected from the defined set of syndrome circuit segments prior to the beginning of the performance of the quantum circuit based on quantum errors identified in the performance of previous quantum circuits, user input, and/or the like.

At step/operation 704, the controller 30 causes the performance of the first plurality of syndrome circuit segments. For example, the controller 30 controls operation of various elements of the quantum processor 115 to cause the first plurality of syndrome circuit segments to be performed and the respective syndromes to be generated, determined, and/or extracted from respective logical qubits. For example, for each syndrome circuit segment of the first plurality of syndrome circuit segments, a process similar to that described with respect to FIG. 6 may be performed.

At step/operation 706, the results of the first plurality of syndrome circuit segments is processed and/or analyzed by the controller 30 and/or classical computing entity 10. For example, distributions of syndromes, distributions of changes in syndromes, and/or the like may be determined and processed. For example, in an example embodiment, the results of the first plurality of syndrome circuit segments is processed using a stochastic technique to determine and/or predict whether all, the majority, and/or the dominant errors experienced by the respective logical qubit have been captured and/or characterized through the performance of the first plurality of syndrome circuit segments.

At step/operation 708, based on the outcome of processing and/or analyzing the results of the first plurality of syndrome circuit segments, the controller 30 and/or classical computing entity 10 determines whether the syndrome extraction process of the quantum error cycle is complete. For example, when the outcome of processing and/or analyzing the results of the first plurality of syndrome circuit segments indicates that all, the majority, and/or the dominant errors experienced by the respective logical qubit have been captured and/or characterized through the performance of the first plurality of syndrome circuit segments, it is determined that the syndrome extraction process of the quantum error cycle is complete. For example, when the outcome of processing and/or analyzing the results of the first plurality of syndrome circuit segments indicates that some, the majority, and/or dominant errors experienced by the respective logical qubit have not been captured and/or characterized through the performance of the first plurality of syndrome circuit segments, it is determined that the syndrome extraction process of the quantum error cycle is not complete and the process continues to step/operation 710.

In another example, when it is determined that a sufficient amount of information has been extracted from one or more logical qubits such that a quantum error decoder operating on the classical computing entity 10 can determine an appropriate quantum error correction for the logical qubit, it is determined that syndrome extraction process of the quantum error cycle is complete. For example, when it is determined that there is not a sufficient amount of information for the quantum error decoder operating on the classical computing entity 10 to confidently determine an appropriate quantum error correction for the logical qubit, it is determined that the syndrome extraction process of the quantum error cycle is not complete and the process continues to step/operation 710.

At step/operation 710, a second plurality of syndrome circuit segments are selected from the defined set of syndrome circuit segments. In an example embodiment, the controller 30 and/or classical computing entity 10 selects the second plurality of syndrome circuit segments randomly and/or based on a stochastic process from the defined set of syndrome circuit segments. In an example embodiment, the controller 30 and/or classical computing entity 10 selects the second plurality of syndrome circuit segments from the defined set of syndrome circuit segments based at least in part on the results of performing the first plurality of syndrome circuit segments. For example, the controller 30 and/or classical computing entity 10 selects the second plurality of syndrome circuit segments from the defined set of syndrome circuit segments based at least in part on errors already observed and/or expected to be present in the performance of the quantum circuit, additional information required for the quantum error decoder to confidently determine an appropriate quantum error correction, and/or the like. In an example embodiment, the second plurality of syndrome circuit segments are selected from the defined set of syndrome circuit segments prior to the beginning of the performance of the quantum circuit based on quantum errors identified in the performance of previous quantum circuits, user input, and/or the like. In various embodiments, there may be overlap between the first plurality of syndrome circuit segments and the second plurality of syndrome circuit segments. In an example embodiment, the first plurality of syndrome circuit segments does not overlap with the second plurality of syndrome circuit segments.

At step/operation 712, the controller 30 causes the performance of the second plurality of syndrome circuit segments. For example, the controller 30 controls operation of various elements of the quantum processor 115 to cause the second plurality of syndrome circuit segments to be performed and the respective syndromes to be generated, determined, and/or extracted from respective logical qubits. For example, for each syndrome circuit segment of the second plurality of syndrome circuit segments, a process similar to that described with respect to FIG. 6 may be performed.

At step/operation 714, the results of the second plurality of syndrome circuit segments is processed and/or analyzed by the controller 30 and/or classical computing entity 10. For example, distributions of syndromes, distributions of changes in syndromes, and/or the like may be determined and processed. For example, in an example embodiment, the results of the second plurality of syndrome circuit segments is processed using a stochastic technique to determine and/or predict whether all, the majority, and/or the dominant errors experienced by the respective logical qubit have been captured and/or characterized through the performance of the first and second pluralities of syndrome circuit segments. In an example embodiment, the controller 30 and/or classical computing entity 10 may determine whether a third plurality of syndrome circuit segments should be performed or not. In an example embodiment, upon completion of the performance of the second plurality of syndrome circuit segments, the syndrome extraction of the quantum error correction cycle is determined to be complete.

In various embodiments, the defined set of syndrome circuit segments includes flagged syndrome circuit segments and unflagged syndrome circuit segments. A flagged syndrome circuit segment uses an ancilla qubit as a flag qubit (or one or more ancilla qubits as flag qubits). The value of the flag qubit is configured to indicate the presence or absence of one or more particular types of errors in the quantum circuit and/or respective logical qubit. In various embodiments, a flagged syndrome circuit segment is configured to determine a particular syndrome of the respective logical qubit using fewer ancilla qubits that a corresponding conventional and/or unflagged syndrome circuit segment. In an example embodiment, a flag qubit is configured to indicate when an error has occurred while performing the syndrome circuit segment.

Figure 8:
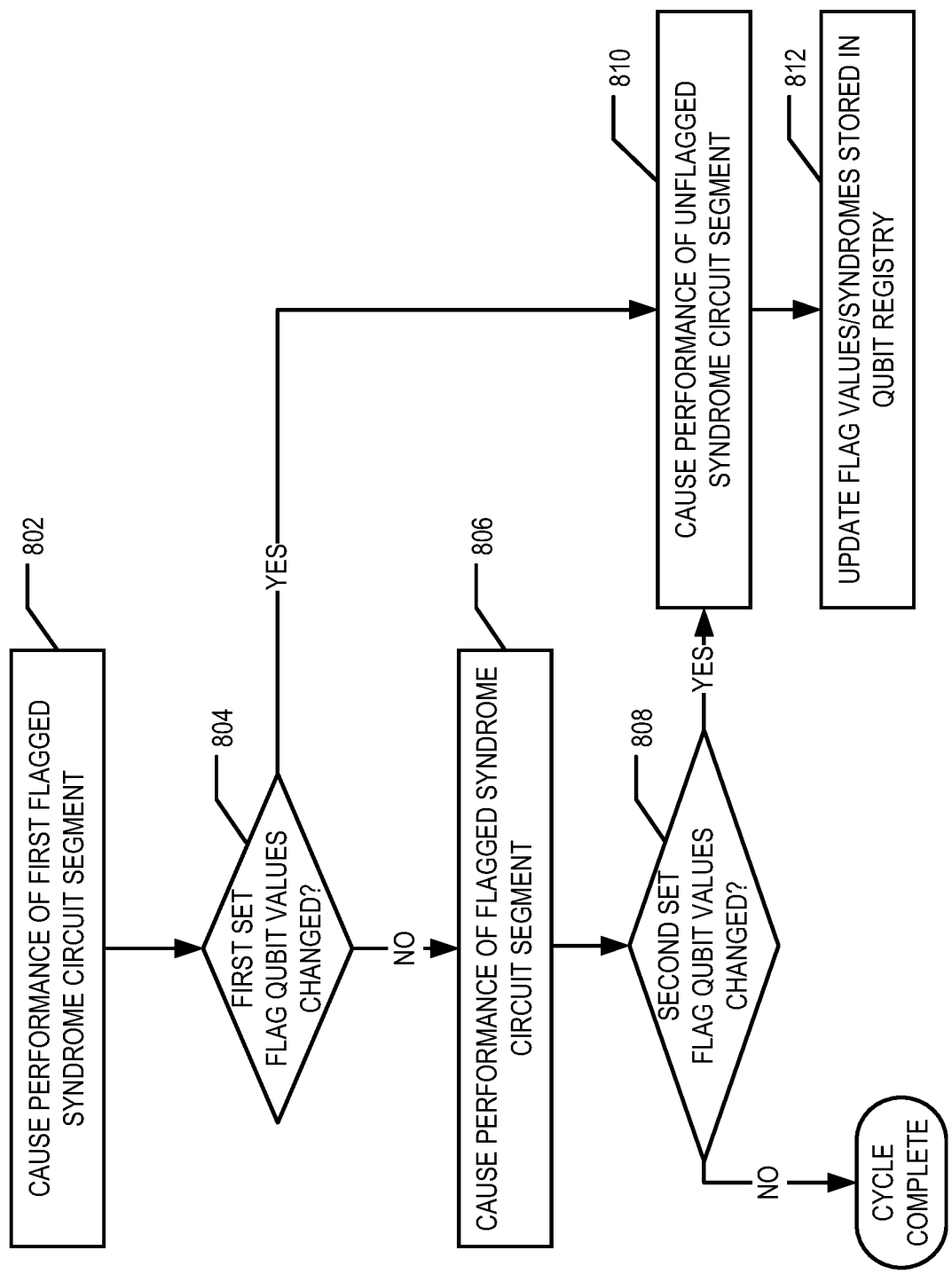
FIG. 8 is a flowchart illustrating various processes, operations, and/or procedures performed by a controller, such as the controller of FIG. 4, for example, to determine syndrome(s) of a logical qubit, according to various embodiments.

FIG. 8 is a flowchart illustrating various processes, operations, and/or procedures performed by a controller 30, for example, to determine syndrome(s) of a logical qubit using a combination of flagged and unflagged syndrome circuit segments, according to various embodiments. For example, flagged syndrome circuit segments may be used to identify the presence (and/or absence) of Hook errors, in which interactions between ancilla qubits and data qubits is causing spreading of logical errors. For example, the processes, operations, and/or procedures of FIG. 8 may be performed as part of step/operation 502, in an example embodiment.

Starting at step/operation 802, the controller 30 causes performance of a first flagged syndrome circuit segment. For example, the controller 30 controls operation of various elements of the quantum processor 115 to cause the first flagged syndrome circuit segment to be performed and first flagged syndromes to be generated, determined, and/or extracted from respective logical qubits. For example, a first set of flag qubit values is determined through performance of the first flagged syndrome circuit segment. For example, a process similar to that described with respect to FIG. 6 may be performed to cause performance of the first flagged syndrome circuit segment.

In various embodiments, the first flagged syndrome circuit segment probes a first set of aspects of the respective logical qubit. For example, the first flagged syndrome circuit segment probes a first set of stabilizers. For example, when a stabilizer code is used to perform the fault tolerant quantum error correction, a commuting set of operators referred to as stabilizers are measured and/or used to detect errors experienced by respective logical qubits. The stabilizer measurements form an error syndrome that can be processed using the quantum error decoder to determine one or more quantum error corrections. Thus, in an example embodiment, the first flagged syndrome circuit segment is configured to probe a first set of these stabilizers.

At step/operation 804, the first set of flag qubit values (e.g., a set of values indicating the respective quantum states of the ancilla qubits used in the first flagged syndrome circuit segment as the flag qubits) is compared to a previous first set of flag qubit values stored in the classical qubit registry corresponding to the respective logical qubit. For example, the controller 30 and/or the classical computing entity 10 compares the determined first set of flag qubit values to the first set of flag qubit values stored in the classical qubit registry to determine whether the first set of flag qubit values has changed since the (immediately) previously determined first set of flag qubit values.

When the determined first set of flag qubit values and the first set of flag qubit values stored in the classical qubit registry are the same, the corresponding syndrome has not changed. When the determined first set of flag qubit values and the first set of flag qubit values stored in the classical qubit registry are not the same, the corresponding syndrome has changed.

When it is determined (and/or responsive to determining) at step/operation 804 that the first set of flag qubit values has changed since the (immediately) previously determined first set of flag qubit values, the process continues to step/operation 810. When it is determined (and/or responsive to determining) at step/operation 804 that the first set of flag qubit values has not changed since the (immediately) previously determined first set of flag qubit values, the process continues to step/operation 806.

At step/operation 806, the controller 30 causes performance of a second flagged syndrome circuit segment. For example, the controller 30 controls operation of various elements of the quantum processor 115 to cause the second flagged syndrome circuit segment to be performed and second flagged syndromes to be generated, determined, and/or extracted from respective logical qubits. For example, a second set of flag qubit values is determined through performance of the second flagged syndrome circuit segment. For example, a process similar to that described with respect to FIG. 6 may be performed to cause performance of the second flagged syndrome circuit segment.

In various embodiments, the second flagged syndrome circuit segment probes a second set of aspects of the respective logical qubit. For example, the second flagged syndrome circuit segment probes a second set of stabilizers. For example, in an example embodiment, the second flagged syndrome circuit segment is configured to probe a second set of stabilizers. In various embodiments, the first set of stabilizers and the second set of stabilizers do not overlap. In an example embodiment, the first set of stabilizers and the second set of stabilizers are orthogonal to one another and/or probe orthogonal frames of the respective logical qubit.

At step/operation 808, the second set of flag qubit value (e.g., a value indicating the quantum state of the ancilla qubit used in the second flagged syndrome circuit segment as the flag qubit) is compared to a previous second set of flag qubit values stored in the classical qubit registry corresponding to the respective logical qubit. For example, the controller 30 and/or the classical computing entity 10 compares the determined second set of flag qubit values to the second set of flag qubit values stored in the classical qubit registry to determine whether the second set of flag qubit values has changed since the (immediately) previously determined second set of flag qubit values.

When the determined second set of flag qubit values and the second set of flag qubit values stored in the classical qubit registry are the same, the corresponding syndrome has not changed. When the determined second set of flag qubit values and the second set of flag qubit values stored in the classical qubit registry are not the same, the corresponding syndrome has changed.

When it is determined (and/or responsive to determining) at step/operation 808 that the second set of flag qubit values has changed since the (immediately) previously determined second set of flag qubit values, the process continues to step/operation 810. When it is determined (and/or responsive to determining) at step/operation 808 that the second set of flag qubit values has not changed since the (immediately) previously determined second set of flag qubit values, it is determined that the quantum error correction cycle for the respective qubit is complete. For example, because the first set of flag qubit values has not changed and the second set of flag qubit values has not changed from the respective previously determined values stored in the classical qubit registry, it may be determined that no new quantum error correction need be determined and applied.

At step/operation 810, the controller 30 causes performance of an unflagged syndrome circuit segment. In an example embodiment, the unflagged syndrome circuit segment measures and/or determines values corresponding to each stabilizer of the set of stabilizers. For example, the result of unflagged syndrome circuit segment is a set of syndromes including a syndrome for each stabilizer of the set of stabilizers. For example, a process similar to that described with respect to FIG. 6 may be performed to cause performance of the unflagged syndrome circuit segment.

At step/operation 812, the classical qubit registry for the respective logical qubit (e.g., stored in memory 410 and/or memory 922, 924) is updated with the determined first and/or second set of flag qubit values and the determined syndrome(s). For example, the classical qubit registry for the respective logical qubit is updated based on the results of performing the first flagged syndrome circuit segment, the second flagged syndrome circuit segment, and/or the unflagged syndrome circuit segment. For example, the controller 30 and/or classical computing entity 10 updates classical qubit registry for the respective logical qubit based on the results of performing the first flagged syndrome circuit segment, the second flagged syndrome circuit segment, and/or the unflagged syndrome circuit segment Example Computing Entity FIG. 9 provides an illustrative schematic representative of an example classical computing entity 10 (also referred to as computing entity herein) that can be used in conjunction with embodiments of the present disclosure. In various embodiments, a classical computing entity 10 is a classical (e.g., semiconductor-based) computer configured to allow a user to provide input to the quantum computer 110 (e.g., via a user interface of the computing entity 10) and receive, display, analyze, and/or the like output from the quantum computer 110. In an example embodiment, the classical computing entity 10 is part of the controller 30.

As shown in FIG. 9, a classical computing entity 10 can include an antenna 912, a transmitter 904 (e.g., radio), a receiver 906 (e.g., radio), and a processing element 908 that provides signals to and receives signals from the transmitter 904 and receiver 906, respectively. The signals provided to and received from the transmitter 904 and the receiver 906, respectively, may include signaling information/data in accordance with an air interface standard of applicable wireless systems to communicate with various entities, such as a quantum system controller 30, other computing entities 10, and/or the like. The computing entity 10 can include a network interface 920, which may provide signals to and receive signals in accordance with an interface standard of applicable network systems to communicate with various entities, such as a quantum system controller 30, other computing entities 10, and/or the like.

In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 916 and/or speaker/speaker driver coupled to a processing element 908 and a touch screen, keyboard, mouse, and/or microphone coupled to a processing element 908). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 918 (hard or soft), a touch display, voice/speech or motion interfaces, scanners, readers, or other input device. In embodiments including a keypad 918, the keypad 918 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 922 and/or non-volatile storage or memory 924, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

In various embodiments, the classical computing entity 10 is configured to receive information from the controller 30 (e.g., ancilla qubit values, data qubit and/or logical qubit values, syndromes corresponding to respective logical qubits, and/or the like) and perform various processes based thereon. For example, the classical computing entity 10 may receive ancilla qubit values and determine one or more syndromes for one or more logical qubits. For example, the classical computing entity 10 may operate a quantum error decoder and/or otherwise be configured to determine one or more quantum error corrections for one or more logical qubits based on one or more respective syndromes for the one or more logical qubits. For example, the classical computing entity 10 may determine one or more quantum error corrections for respective logical qubits and provide (e.g., transmit) the quantum error corrections such that the controller 30 receives and can cause performance of the quantum error corrections. In an example embodiment, the classical computing entity 10 stores and/or updates one or more qubit registries (e.g., in memory 922, 924) based on one or more quantum error corrections.

Example Operation of a Controller of Quantum Computing System to Perform a Fault Tolerant Logical Multi-Qubit Gate In various embodiments, the quantum computer 110 is configured to perform fault tolerant logical multi-qubit gates. For example, the controller 30 is configured to control the quantum processor 115 to cause the quantum processor 115 to perform a fault tolerant logical multi-qubit gate (e.g., a logical gate performed in a fault tolerant manner on two or more logical qubits).

In various embodiments, performance of the logical multi-qubit gate comprises performance of a sequence of at-least-two-physical-qubits interactions between respective physical qubits of the set of physical qubits comprising the data qubits of the logical qubits on which the gate is being performed and one or more ancilla qubits. In various embodiments, the sequence of at-least-two-physical-qubits interactions is divided into two or more groups such that the logical multi-qubit gate is performed in parts. Between successive parts, a multi-qubit quantum error correction cycle may be performed. In various embodiments, a multi-qubit quantum error correction cycle is similar to the quantum error correction cycles described elsewhere herein.

In various embodiments, as a result of the performance of the multi-qubit quantum error correction cycle, one or more at-least-two-physical-qubits interactions of a successive part of the logical multi-qubit gate may be modified based on a determined quantum error correction. In various embodiments, one or more quantum error corrections are performed between performance of successive parts of the logical multi-qubit gate and/or after performance of the logical multi-qubit gate.

In various embodiments, the controller causes tracking of the syndromes and/or quantum error corrections determined during the multi-qubit quantum error correction cycle in a classical memory.

In various embodiments, performance of at least one of the groups of at-least-two-physical-qubits interactions and/or at least one syndrome circuit segment of the multi-qubit quantum error correction cycle includes causing transportation of one or more physical qubits of the set of physical qubits into or out of one or more interaction zones defined by the quantum processor.

FIG. 10 provides a flowchart illustrating various processes, procedures, operations, and/or the like performed by a controller 30, for example, to cause the quantum processor 115 to perform a fault tolerant logical multi-qubit gate on at least a first logical qubit and a second logical qubit.

Starting at step/operation 1002, the controller causes the quantum processor to perform a first part of a logical multi-qubit gate. In various embodiments, causing performance of the first part of the logical multi-qubit gate comprises causing performance of a first group of at-least-two-physical-qubits interactions on at least a first subset of physical qubits of a set of physical qubits. The set of physical qubits comprises data qubits of a first logical qubit, data qubits of a second logical qubit, and one or more ancilla qubits. The logical multi-qubit gate is being performed on at least the first logical qubit and the second logical qubit.

At step/operation 1004, the controller causes the quantum processor to perform of a multi-qubit quantum error correction cycle. In various embodiments, performing the multi-qubit quantum error correction cycle comprises performing at least one syndrome circuit segment to determine at least one syndrome and at least one quantum error correction. For example, syndrome circuit segments may be performed as described elsewhere herein to determine respective syndromes and quantum error corrections may be determined (e.g., using a quantum error decoder operating on a classical computing entity 10, for example) based on the determined syndromes.

In various embodiments, the multi-qubit quantum error correction cycle may result in determination of one or more syndromes for the first logical qubit and/or one or more syndromes for the second logical qubit. In various embodiments, the multi-qubit quantum error correction cycle may result in determination of one or more quantum error corrections for the first logical qubit and/or one or more quantum error corrections for the second logical qubit. In various embodiments, the multi-qubit quantum error correction cycle results in determination of one or more syndromes that describe a combination of errors present in the first logical qubit and the second logical qubit and corresponding quantum error corrections. For example, the first and second logical qubits may be treated separately and/or independently during the multi-qubit quantum error correction cycle or treated as a combined set of physical qubits during the multi-qubit quantum error correction cycle.

At step/operation 1006, the controller may cause the syndromes and/or quantum error corrections determined through the multi-qubit quantum error correction cycle to be tracked in a classical memory (e.g., memory 410 and/or memory 922, 924). As should be understood, the tracking of the syndromes and/or quantum error corrections may include application of software corrections to a classical qubit registry stored in a classical memory (e.g., memory 410 and/or memory 922, 924).

At step/operation 1008, the controller causes the performance of one or more physical corrections to one or more data qubits of the first logical qubit and/or the second logical qubit and/or causes the modification of one or more at-least-two-physical-qubits interactions of the second part (or third part or other successive part) of the logical multi-qubit gate based on the determined quantum error corrections. For example, in an example embodiment, at least one at-least-two-physical-qubits interaction of the second group of at-least-two-physical-qubits interactions is modified based at least in part on the at least one quantum error correction. For example, in an example embodiment, a physical correction is performed on at least one of the first logical qubit or the second logical qubit prior to the performance of the second group of at-least-two-physical-qubits interactions.

At step/operation 1010, the controller causes the quantum processor to perform a second part of the logical multi-qubit gate. For example, the controller causes the quantum processor to perform a second part of the logical multi-qubit gate by causing performance of a second group of at-least-two-physical-qubits interactions on at least a second subset of physical qubits of the set of physical qubits.

At step/operation 1012, the controller causes performance of a quantum error correction (e.g., determined during a multi-qubit quantum error correction cycle) one the first logical qubit and/or the second logical qubit. For example, in an example embodiment, the controller causes at least one of (a) a physical correction is performed on at least one of the first logical qubit or the second logical qubit after completion of the logical multi-qubit gate based on the at least one quantum error correction or (b) an operation performed on at least one of the first logical qubit or the second logical qubit after completion of the logical multi-qubit gate is modified based at least in part on the at least one quantum error correction.

In various embodiments, performing at least one of the first group of at-least-two-physical-qubits interactions, the at least one syndrome circuit segment, or the second group of at-least-two-physical qubits interactions comprises causing transportation of one or more physical qubits of the set of physical qubits into or out of one or more interaction zones defined by the quantum processor to enable performance of respective at-least-two-physical-qubits interactions within respective ones of the one or more interaction zones.

Technical Advantages

Complex quantum computations demand levels of precision that are not available in conventional quantum computers due to imperfect control and noise in gate operations between data qubits, for example. Proposed schemes for quantum error correction include the extraction of syndromes which generally includes the interaction of ancilla qubits with data qubits of a logical qubit. However, if not performed carefully, such interactions between ancilla qubits and data qubits can cause faults to spread ruinously, leading to logical errors that would have otherwise been correctable given their initial weight. Thus, technical problems exist regarding how to perform quantum computations with levels of precision that are sufficient for performing complex computations. Moreover, technical problems exist regarding how to extract information from the logical qubits needed to diagnose and correct errors without causing additional spreading of errors.

Various embodiments provide technical solutions to such technical problems. For example, various embodiments provide for the performance of fault tolerate quantum computing and/or fault tolerant quantum error correction using physical transportation of physical qubits. For example, syndromes may be generated, determined, and/or extracted from a logical qubit through the interaction of data qubits of the logical qubit with ancilla qubits. The data qubits and/or the ancilla qubits may be physically transported into and/or out of interaction zones so that an ancilla qubit may interact with a plurality of data qubits of the logical qubit. Additionally, an ancilla qubit may be used to (serially) perform syndrome circuit segments for a plurality of logical qubits. Thus, various embodiments provide fault tolerant quantum error correction with a minimized and/or reduced number of ancilla qubits. By minimizing and/or reducing the number of ancilla qubits required, the number of physical qubits used may be reduced and/or more of the physical qubits of the quantum processor 115 are available for use as data qubits, enabling larger numbers of logical qubits to be used. Additionally, in various embodiments, the use of flagged syndrome circuit segments to determine when or if the performance of an unflagged syndrome circuit segment is warranted enables the identification of when additional error spreading is occurring and allowing mitigation thereof. Thus, various embodiments provide improvements over conventional quantum error correction schemes.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method performed by a quantum computing system comprising a classical computing entity, a controller, and a quantum processor, the controller configured to (a) control operation of the quantum processor and (b) communicate with the classical computing entity, the method comprising:
   causing, by the controller, performance of at least one syndrome circuit segment to generate a syndrome of a logical qubit, the at least one syndrome circuit segment performed at least in part by causing performance of a sequence of transportation operations and at-least-two-physical-qubits interactions, wherein each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the at least one of (a) the respective data qubit of the logical qubit or (b) the respective ancilla qubit is disposed within the respective interaction zone and a respective at-least-two-physical-qubits interaction is performed thereon;
   based at least in part on the syndrome of the logical qubit, determining, by the classical computing entity, at least one quantum error correction; and
   causing, by the controller, a classical memory of at least one of the controller or the classical computing entity to be updated based on at least one of the syndrome or the at least one quantum error correction.

2. The method of claim 1, further comprising causing, by the controller, the at least one quantum error correction to be applied to the logical qubit.

3. The method of claim 1, wherein performance of the at least one syndrome circuit segment comprises performance of a plurality of syndrome circuit segments.

4. The method of claim 1, wherein the logical qubit is one of a plurality of logical qubits and the respective ancilla qubit is used to perform syndrome circuit segments for two or more logical qubits of the plurality of logical qubits.

5. The method of claim 1, wherein the at least one syndrome circuit segment comprises a flagged syndrome circuit segment wherein a first ancilla qubit of two or more ancilla qubits used to perform the at least one syndrome circuit segment is used as flag qubit.

6. The method of claim 1, wherein the classical memory is updated based on at least one of the syndrome or the at least one quantum error correction comprises tracking the syndrome of the logical qubit in the classical memory.

7. The method of claim 1, wherein coherence of the respective data qubit of the logical qubit is maintained during performance of the at least one syndrome circuit segment.

8. The method of claim 1, further comprising:
   prior to causing performance of the at least one syndrome circuit segment, causing performance of a state preparation circuit segment for preparing a state of the respective ancilla qubit; and
   causing the respective ancilla qubit to be read after the performance of the sequence of transportation operations and at-least-two-physical-qubits interactions, wherein the syndrome of the logical qubit is generated based at least in part on a result of the reading of the respective ancilla qubit.

9. The method of claim 2, wherein causing the at least one quantum error correction to be applied to the logical qubit comprises at least one of:
updating a classical qubit registry corresponding to logical qubit based on the at least one quantum error correction,
causing performance of a physical correction to one or more data qubits of the logical qubit, or
causing a logical operation to be performed at least in part on one or more data qubits of the logical qubit to be modified based at least in part on the at least one quantum error correction.

10. The method of claim 9, wherein causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

11. The method of claim 3, wherein causing performance of the at least one syndrome circuit segment comprises:
causing performance of a first plurality of syndrome circuit segments, wherein the first plurality of syndrome circuit segments were selected from a defined set of syndrome circuit segments using a stochastic selection process;
determining, based at least in part on respective results of the first plurality of syndrome circuit segments, whether to cause performance of a second plurality of syndrome circuit segments, the second plurality of syndrome circuit segments selected from the defined set of syndrome circuit segments;
responsive to determining to cause performance of the second plurality of syndrome circuit segments, causing performance of the second plurality of syndrome circuit segments; and
responsive to determining to not cause performance of the second plurality of syndrome circuit segments, determining the at least one quantum error correction based at least in part on the respective results of the first plurality of syndrome circuit segments.

12. The method of claim 5, further comprising:
tracking, using at least one classical qubit registry, a value of the flag qubit; and
causing performance of an unflagged syndrome circuit segment in response to determining that the value of the flag qubit has changed.

13. A controller of a quantum computing system, the controller (a) configured to control operation of a quantum processor of the quantum computing system and (b) comprising a processing element and a memory storing executable instructions configured to, when executed by the processing element, cause the controller to at least:
cause performance of at least one syndrome circuit segment to generate a syndrome of a logical qubit, the at least one syndrome circuit segment performed at least in part by causing performance of a sequence of transportation operations and at-least-two-physical-qubits interactions, wherein each transportation operation of the sequence of transportation operations and at-least-two-physical-qubits interactions causes physical transport of at least one of (a) a respective data qubit of the logical qubit or (b) a respective ancilla qubit into a respective interaction zone defined by the quantum processor such that the at least one of (a) the respective data qubit of the logical qubit or (b) the respective ancilla qubit is disposed within the respective interaction zone and a respective at-least-two-physical-qubits interaction is performed thereon;
cause determining of at least one quantum error correction based at least in part on the syndrome of the logical qubit; and
cause a classical memory of at least one of the controller or a classical computing entity of the quantum computing system to be updated based on at least one of the syndrome or the at least one quantum error correction.

14. The controller of claim 13, wherein the executable instructions are further configured to, when executed by the processing element, cause the controller to at least cause the at least one quantum error correction to be applied to the logical qubit.

15. The controller of claim 13, wherein causing the at least one quantum error correction to be applied to the logical qubit comprises at least one of:
updating a classical qubit registry corresponding to logical qubit based on the at least one quantum error correction,
causing performance of a physical correction to one or more data qubits of the logical qubit, or
causing a logical operation to be performed at least in part on one or more data qubits of the logical qubit to be modified based at least in part on the at least one quantum error correction.

16. The controller of claim 13, wherein causing performance of the at least one syndrome circuit segment comprises:
causing performance of a first plurality of syndrome circuit segments, wherein the first plurality of syndrome circuit segments were selected from a defined set of syndrome circuit segments using a stochastic selection process;
determining, based at least in part on respective results of the first plurality of syndrome circuit segments, whether to cause performance of a second plurality of syndrome circuit segments, the second plurality of syndrome circuit segments selected from the defined set of syndrome circuit segments;
responsive to determining to cause performance of the second plurality of syndrome circuit segments, causing performance of the second plurality of syndrome circuit segments; and
responsive to determining to not cause performance of the second plurality of syndrome circuit segments, determining the at least one quantum error correction based at least in part on the respective results of the first plurality of syndrome circuit segments.

17. The controller of claim 13, wherein the logical qubit is one of a plurality of logical qubits and the respective ancilla qubit is used to perform syndrome circuit segments for two or more logical qubits of the plurality of logical qubits.

18. The controller of claim 13, wherein the at least one syndrome circuit segment comprises a flagged syndrome circuit segment wherein a first ancilla qubit of two or more ancilla qubits used to perform the at least one syndrome circuit segment is used as flag qubit and wherein the executable instructions are further configured to, when executed by the processing element, cause the controller to at least:
track, using at least one classical qubit registry, a value of the flag qubit; and cause performance of an unflagged syndrome circuit segment in response to determining that the value of the flag qubit has changed.

19. The controller of claim 13, wherein the executable instructions are further configured to, when executed by the processing element, cause the controller to at least:

prior to causing performance of the at least one syndrome circuit segment, cause performance of a state preparation circuit segment for preparing a state of the respective ancilla qubit; and cause the respective ancilla qubit to be read after the performance of the sequence of transportation operations and at-least-two-physical-qubits interactions, wherein the syndrome of the logical qubit is generated based at least in part on a result of the reading of the respective ancilla qubit.

20. The controller of claim 15, wherein causing performance of the physical correction to the one or more data qubits of the logical qubit comprises performing one or more transportation operations on the one or more data qubits to cause the one or more data qubits to be transported at least one of (a) into or (b) out of one or more interaction zones defined by the quantum processor.

21. A method for performing a logical multi-qubit gate, the method comprising:

causing, by a controller configured to control operation of a quantum processor, the quantum processor to perform a first part of the logical multi-qubit gate by causing performance of a first group of at-least-two-physical-qubits interactions on at least a first subset of physical qubits of a set of physical qubits, wherein the set of physical qubits comprises data qubits of a first logical qubit, data qubits of a second logical qubit, and one or more ancilla qubits, wherein the logical multi-qubit gate is being performed on at least the first logical qubit and the second logical qubit;

causing, by the controller, the quantum processor to perform a multi-qubit quantum error correction cycle comprising performance of at least one syndrome circuit segment to determine at least one syndrome and at least one quantum error correction; and causing, by the controller, the quantum processor to perform a second part of the logical multi-qubit gate by causing performance of a second group of at-least-two-physical-qubits interactions on at least a second subset of physical qubits of the set of physical qubits.

22. The method of claim 21, wherein at least one at-least-two-physical-qubits interaction of the second group of at-least-two-physical-qubits interactions is modified based at least in part on the at least one quantum error correction.

23. The method of claim 21, further comprising at least one of (a) causing performance of a physical correction on at least one of the first logical qubit or the second logical qubit after completion of the logical multi-qubit gate based on the at least one quantum error correction or (b) causing performance of an operation on at least one of the first logical qubit or the second logical qubit after completion of the logical multi-qubit gate is modified based at least in part on the at least one quantum error correction.

24. The method of claim 21, wherein a physical correction is performed on at least one of the first logical qubit or the second logical qubit prior to the performance of the second group of at-least-two-physical-qubits interactions.

25. The method of claim 21, further comprising causing tracking of at least one of the at least one syndrome or the at least one quantum error correction in a classical memory.

26. The method of claim 21, wherein performing at least one of the first group of at-least-two-physical-qubits interactions, the at least one syndrome circuit segment, or the second group of at-least-two-physical-qubits interactions comprises causing transportation of one or more physical qubits of the set of physical qubits into or out of one or more interaction zones defined by the quantum processor.

* * * * *